US009170696B2

(12) United States Patent
Ishizaki et al.

(10) Patent No.: US 9,170,696 B2
(45) Date of Patent: Oct. 27, 2015

(54) DISPLAY DEVICE WITH TOUCH DETECTING FUNCTION AND ELECTRONIC APPARATUS

(71) Applicant: Japan Display Inc., Tokyo (JP)

(72) Inventors: Koji Ishizaki, Tokyo (JP); Hayato Kurasawa, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 35 days.

(21) Appl. No.: 14/219,212

(22) Filed: Mar. 19, 2014

(65) Prior Publication Data

US 2014/0320760 A1    Oct. 30, 2014

(30) Foreign Application Priority Data

Mar. 27, 2013    (JP) .................................. 2013-067515

(51) Int. Cl.
  *G06F 3/041*    (2006.01)
  *G06F 3/044*    (2006.01)
(52) U.S. Cl.
  CPC ..................................... *G06F 3/044* (2013.01)
(58) Field of Classification Search
  None
  See application file for complete search history.

(56) References Cited

U.S. PATENT DOCUMENTS

| 2012/0268418 A1* | 10/2012 | Ishizaki et al. | 345/174 |
| 2013/0016363 A1* | 1/2013 | Iwamoto | 356/616 |
| 2014/0118641 A1* | 5/2014 | Ryu et al. | 349/12 |

FOREIGN PATENT DOCUMENTS

| JP | 2010-197576 | 9/2010 |
| JP | 2011-059771 | 3/2011 |

* cited by examiner

*Primary Examiner* — Joseph Haley
(74) *Attorney, Agent, or Firm* — K&L Gates LLP

(57) ABSTRACT

According to an aspect, a display device with a touch detecting function includes: a display area in which pixels each composed of a plurality of color areas are arranged in a matrix; a touch detection electrode including a first conductive thin wire extending in a first direction; and a dummy electrode including a plurality of second conductive thin wires; a drive electrode having capacitance for the touch detection electrode. Each of the second conductive thin wires includes a plurality of thin wire pieces extending in a direction different from the first direction and is divided by a slit between the thin wire pieces. A color area in the display area with which the slit overlaps has a different color from a color area in the display area with which a slit closest to the slit in a second direction orthogonal to the first direction overlaps.

16 Claims, 31 Drawing Sheets

551 UPPER HOUSING

552 LOWER HOUSING

CONNECTION 553
551 UPPER HOUSING
555 SUB-DISPLAY
556 PICTURE LIGHT
557 CAMERA

LOWER HOUSING
552
553 CONNECTION
551
UPPER HOUSING

UPPER HOUSING
551
552
LOWER HOUSING

DISPLAY DEVICE WITH TOUCH DETECTING FUNCTION AND ELECTRONIC APPARATUS

CROSS REFERENCES TO RELATED APPLICATIONS

The present application claims priority to Japanese Priority Patent Application JP 2013-067515 filed in the Japan Patent Office on Mar. 27, 2013, the entire content of which is hereby incorporated by reference.

BACKGROUND

1. Technical Field

The present disclosure relates to a display device capable of detecting an external proximity object and an electronic apparatus, and in particular to a display device with a touch detecting function capable of detecting an external proximity object based on a change in capacitance and an electronic apparatus.

2. Description of the Related Art

Touch detection devices capable of detecting an external proximity object, which are what is called a touch panel, have been attracting attention in recent years. Touch panels are attached or integrated on display devices, such as liquid-crystal display devices, and are used for display devices with a touch detecting function. In display devices with a touch detecting function, displaying various types of button images and the like on a display device enables input of information using the touch panel as a substitute for general mechanical buttons. Such display devices with a touch detecting function including a touch panel require no input device, such as a keyboard, a mouse, and a keypad. As a result, display devices with a touch detecting function have been increasingly used for portable information terminals, such as mobile phones, besides for computers.

Some types of technologies for touch detection devices are known, including optical, resistive, and capacitive type, for example. By applying a capacitive touch detection device to a portable information terminal, it is possible to provide an apparatus with a relatively simple structure and less power consumption. Japanese Patent Application Laid-open Publication No. 2010-197576 (JP-A-2010-197576), for example, discloses a touch panel that makes a transparent electrode pattern invisible.

Japanese Patent Application Laid-open Publication No. 2011-059771 (JP-A-2011-059771) discloses a mesh-shaped conductive pattern including a mesh pattern that is at least partially separated and excellent in invisibility even at a discontinuous section, a base material with a conductor layer pattern including the mesh-shaped conductive pattern, and a touch panel member.

To provide a display device with a touch detecting function having a smaller thickness, a larger screen, or higher definition, it is necessary to lower the resistance of a touch detection electrode. The touch detection electrode is made of a translucent conductive oxide, such as an indium tin oxide (ITO), serving as a material of a translucent electrode. To lower the resistance of the touch detection electrode, it is effective to use a conductive material, such as a metal material. The conductive material, such as a metal material, transmits less light than a transparent conductive oxide, such as ITO does. This may result in reduced transmittance or visual recognition of the pattern of the touch detection electrode. To address this, a dummy electrode pattern having the same light-shielding property as that of the touch detection electrode is arranged between touch detection electrode patterns. This can reduce the possibility that the touch detection electrode pattern is visually recognized. The dummy electrode pattern not contributing to touch detection needs to be finely divided by slits because it generates capacity difference between the dummy electrode and the touch detection electrode.

In the case where both a touch detection electrode having no slit and a dummy electrode having slits are arranged, it is necessary to make the slits hard to visually recognize. This is because visual recognition of the slits leads to visual recognition of the dummy electrode. To address this, there has been developed a technology for increasing the inconspicuousness of the slits by devising the shape of the slits as disclosed in JP-A-2011-059771. The technology disclosed in JP-A-2011-059771, however, may possibly cause the slits to be visually recognized depending on the positional relation between color areas and the slits in the display device.

For the foregoing reasons, there is a need for a display device with a touch detecting function and an electronic apparatus that can reduce the possibility that a slit of the dummy electrode made of a conductive material, which hardly transmits light, is visually recognized.

SUMMARY

According to an aspect, a display device with a touch detecting function includes: a substrate; a display area in which pixels each composed of a plurality of color areas are arranged in a matrix on a plane parallel to a surface of the substrate; a touch detection electrode including a first conductive thin wire extending in a first direction on a plane parallel to the surface of the substrate; a dummy electrode provided to an area in which the first conductive thin wire is not arranged in a direction perpendicular to the surface of the substrate and including a plurality of second conductive thin wires; a drive electrode having capacitance for the touch detection electrode; and a display functional layer having a function to display an image on the display area. Each of the second conductive thin wires includes a plurality of thin wire pieces extending in a direction different from the first direction and is divided by a slit between the thin wire pieces. A color area in the display area with which the slit overlaps has a different color from a color area in the display area with which a slit closest to the slit in a second direction orthogonal to the first direction overlaps.

According to another aspect, a display device with a touch detecting function includes: a substrate; a display area in which pixels each composed of a plurality of color areas are arranged in a matrix on a plane parallel to a surface of the substrate; a touch detection electrode including a first conductive thin wire extending in a first direction on a plane parallel to the surface of the substrate; a dummy electrode provided to an area in which the first conductive thin wire is not arranged in a direction perpendicular to the surface of the substrate and including a plurality of second conductive thin wires; a drive electrode having capacitance for the touch detection electrode; and a display functional layer having a function to display an image on the display area. The second conductive thin wires are provided parallel to a pixel array direction, in which the pixels are arranged. Each of the second conductive thin wires includes: a first thin wire piece having a portion extending in a direction different from the first direction and arranged at a first arrangement pitch in a second direction orthogonal to the first direction; and a second thin wire piece having a portion extending in a direction different from the first direction, being as long as the first thin wire piece in the first direction, and arranged at a second arrangement pitch different from the first arrangement pitch in the second direction. The first thin wire piece and the second thin wire piece are arranged so as not to overlap with each other in the first direction. An end of the first thin wire piece and an end of the second thin wire piece are arranged in the second direction and do not overlap with each other, thereby forming a slit to divide the second conductive thin wire.

According to another aspect, an electronic apparatus includes a display device with a touch detecting function. The display device with a touch detecting function includes: a substrate; a display area in which pixels each composed of a plurality of color areas are arranged in a matrix on a plane parallel to a surface of the substrate; a touch detection electrode including a first conductive thin wire extending in a first direction on a plane parallel to the surface of the substrate; a dummy electrode provided to an area in which the first conductive thin wire is not arranged in a direction perpendicular to the surface of the substrate and including a plurality of second conductive thin wires; a drive electrode having capacitance for the touch detection electrode; and a display functional layer having a function to display an image on the display area. Each of the second conductive thin wires includes a plurality of thin wire pieces extending in a direction different from the first direction and is divided by a slit between the thin wire pieces. A color area in the display area with which the slit overlaps has a different color from a color area in the display area with which a slit closest to the slit in a second direction orthogonal to the first direction overlaps.

According to another aspect, an electronic apparatus includes a display device with a touch detecting function. The display device with a touch detecting function includes: a substrate; a display area in which pixels each composed of a plurality of color areas are arranged in a matrix in a first direction on a plane parallel to a surface of the substrate; a touch detection electrode including a first conductive thin wire extending on a plane parallel to the surface of the substrate; a dummy electrode provided to an area in which the first conductive thin wire is not arranged in a direction perpendicular to the surface of the substrate and including a plurality of second conductive thin wires; a drive electrode having capacitance for the touch detection electrode; and a display functional layer having a function to display an image on the display area. The second conductive thin wires are provided parallel to a pixel array direction, in which the pixels are arranged. Each of the second conductive thin wires includes: a first thin wire piece having a portion extending in a direction different from the first direction and arranged at a first arrangement pitch in a second direction orthogonal to the first direction; and a second thin wire piece having a portion extending in a direction different from the first direction, being as long as the first thin wire piece in the first direction, and arranged at a second arrangement pitch different from the first arrangement pitch in the second direction. The first thin wire piece and the second thin wire piece are arranged so as not to overlap with each other in the first direction. An end of the first thin wire piece and an end of the second thin wire piece are arranged in the second direction and do not overlap with each other, thereby forming a slit to divide the second conductive thin wire.

Additional features and advantages are described herein, and will be apparent from the following Detailed Description and the figures.

DETAILED DESCRIPTION

Exemplary aspects (embodiments) according to the present disclosure are described in greater detail with reference to the accompanying drawings. The contents disclosed in the following embodiments are not intended to limit the present disclosure. Components described below include components easily conceivable by those skilled in the art and components substantially identical. The components described below can be combined as appropriate. The explanation will be made in the following order.

1. Embodiments (display device with a touch detecting function)
   1-1. First embodiment
   1-2. Second embodiment
   1-3. Third embodiment
   1-4. Fourth embodiment
   1-5. Fifth embodiment
   1-6. Modifications of the above-mentioned embodiments
2. Application examples (electronic apparatuses)
Examples in which the display device with a touch detecting function according to the above-mentioned embodiments is applied to electronic apparatuses
3. Aspects of the present disclosure

1. EMBODIMENTS 1-1. First Embodiment 1-1A. Exemplary Configuration

Exemplary Entire Configuration

Figure 1:
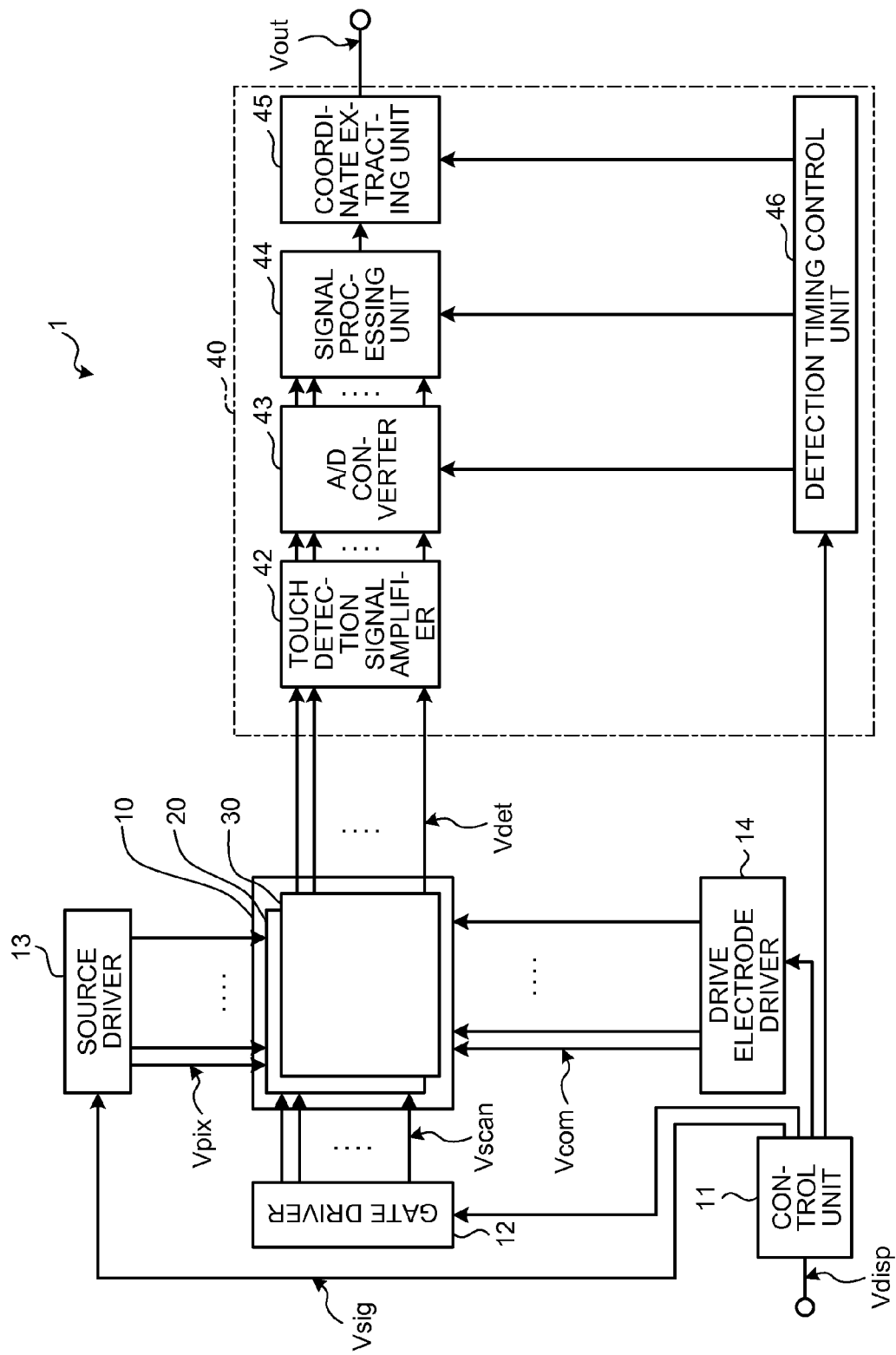
FIG. 1 is a block diagram of an exemplary configuration of a display device with a touch detecting function according to a first embodiment.

FIG. 1 is a block diagram of an exemplary configuration of a display device with a touch detecting function according to a first embodiment. A display device 1 with a touch detecting function includes a display unit 10 with a touch detecting function, a control unit 11, a gate driver 12, a source driver 13, a drive electrode driver 14, and a touch detecting unit 40. In the display device 1 with a touch detecting function, the display unit 10 with a touch detecting function has a touch detecting function. The display unit 10 with a touch detecting function is a device in which a liquid-crystal display unit 20 provided with liquid-crystal display elements as display elements is integrated with a capacitive touch detecting device 30. The display unit 10 with a touch detecting function may be a device in which the capacitive touch detecting device 30 is mounted on the liquid-crystal display unit 20 provided with liquid-crystal display elements as display elements. The liquid-crystal display unit 20 may be an organic electro-luminescence (EL) display unit, for example.

The liquid-crystal display unit 20 performs sequential scanning on each horizontal line based on a scanning signal Vscan supplied from the gate driver 12, thereby performing display, which will be described later. The control unit 11 is a circuit that supplies control signals to the gate driver 12, the source driver 13, the drive electrode driver 14, and the touch detecting unit 40 based on a video signal Vdisp supplied from the outside, thereby controlling these units so as to operate in synchronization with one another.

The gate driver 12 has a function to sequentially select a horizontal line to be a target of display drive of the display unit 10 with a touch detecting function based on the control signal supplied from the control unit 11.

The source driver 13 is a circuit that supplies a pixel signal Vpix to each sub-pixel SPix, which will be described later, of the display unit 10 with a touch detecting function based on the control signal of an image signal Vsig supplied from the control unit 11.

The drive electrode driver 14 is a circuit that supplies a drive signal Vcom to drive electrodes COML, which will be described later, of the display unit 10 with a touch detecting function based on the control signal supplied from the control unit 11.

The touch detecting unit 40 is a circuit that detects whether a touch (a contact or a proximity state, which will be described later) is made on the touch detecting device 30 based on the control signal supplied from the control unit 11 and a touch detection signal Vdet supplied from the touch detecting device 30 of the display unit 10 with a touch detecting function. If a touch is made, the touch detecting unit 40 derives the coordinates of the touch in a touch detection area. The touch detecting unit 40 includes a touch detection signal amplifier 42, an analog/digital (A/D) converter 43, a signal processing unit 44, a coordinate extracting unit 45, and a detection timing control unit 46.

The touch detection signal amplifier 42 amplifies a touch detection signal Vdet supplied from the touch detecting device 30. The touch detection signal amplifier 42 may include an analog low pass filter. The analog low pass filter removes high-frequency components (noise components) included in the touch detection signal Vdet, thereby extracting and outputting touch components.

Basic Principle of Capacitive Touch Detection

Figure 2:
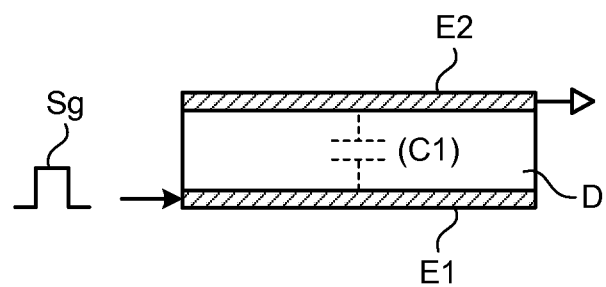
FIG. 2 is an explanatory view illustrating a state where no finger is in contact or in proximity with a device for explanation of the basic principle of a capacitive touch detection technology.
Figure 3:
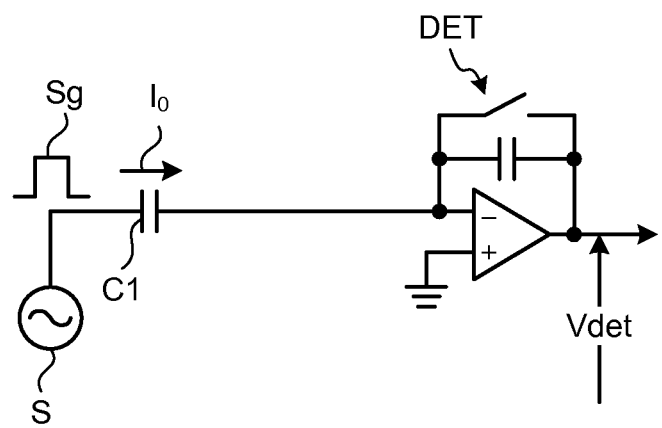
FIG. 3 is a view for explaining an example of an equivalent circuit in the state where no finger is in contact or in proximity with a device illustrated in FIG. 2.
Figure 4:
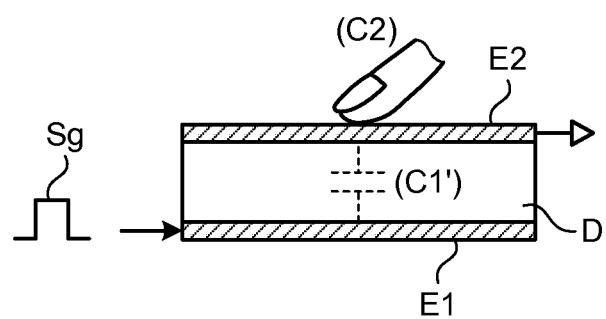
FIG. 4 is an explanatory view illustrating a state where a finger is in contact or in proximity with a device for explanation of the basic principle of the capacitive touch detection technology.
Figure 5:
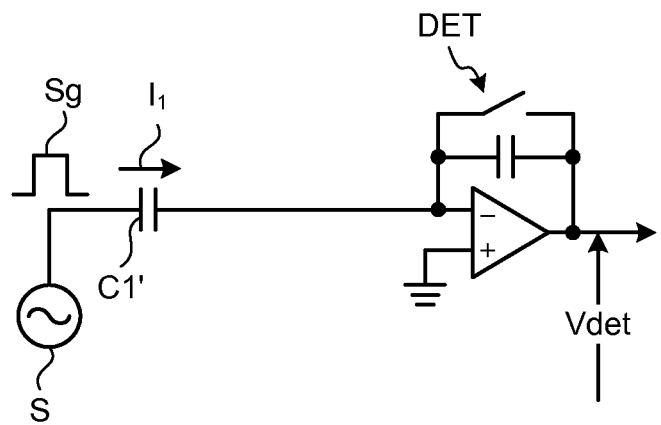
FIG. 5 is a view for explaining an example of the equivalent circuit in the state where the finger is in contact or in proximity with a device illustrated in FIG. 4.
Figure 6:
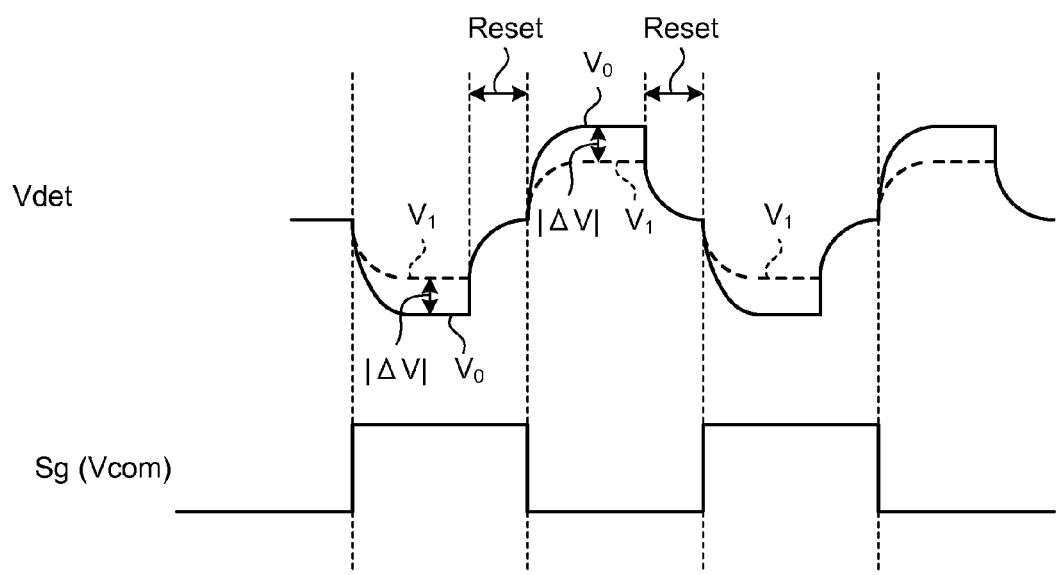
FIG. 6 is a diagram of an example of a waveform of a drive signal and a touch detection signal.

The touch detecting device 30 operates based on the basic principle of capacitive touch detection, thereby outputting the touch detection signal Vdet. The following describes the basic principle of touch detection in the display device 1 with a touch detecting function according to the present embodiment with reference to FIG. 1 to FIG. 6. FIG. 2 is an explanatory view illustrating a state where no finger is in contact or in proximity with a device for explanation of the basic principle of a capacitive touch detection technology. FIG. 3 is a view for explaining an example of an equivalent circuit in the state where no finger is in contact or in proximity with a device illustrated in FIG. 2. FIG. 4 is an explanatory view illustrating a state where a finger is in contact or in proximity with a device for explanation of the basic principle of the capacitive touch detection technology. FIG. 5 is a view for explaining an example of the equivalent circuit in the state where the finger is in contact or in proximity with a device illustrated in FIG. 4. FIG. 6 is a diagram of an example of a waveform of a drive signal and a touch detection signal.

As illustrated in FIG. 2 and FIG. 4, capacitive elements C1 and C1' each include a pair of electrodes of a drive electrode E1 and a touch detection electrode E2 arranged in a manner facing each other with a dielectric D interposed therebetween, for example. As illustrated in FIG. 3, one end of the capacitive element C1 is coupled to an alternating-current (AC) signal source (a drive signal source) S, whereas the other end thereof is coupled to a voltage detector (a touch detecting unit) DET. The voltage detector DET is an integration circuit included in the touch detection signal amplifier 42 illustrated in FIG. 1, for example.

If the AC signal source S applies an alternating-current (AC) rectangular wave Sg at a predetermined frequency (e.g., approximately several kilohertz to several hundred kilohertz) to the drive electrode E1 (the one end of the capacitive element C1), an output waveform (touch detection signal Vdet) is generated via the voltage detector DET coupled to the touch detection electrode E2 (the other end of the capacitive element C1). The AC rectangular wave Sg corresponds to a touch drive signal Vcomt, which will be described later.

In the state where no finger is in contact (or in proximity) with a device (a non-contact state), an electric current $I_0$ depending on the capacitance value of the capacitive element C1 flows in association with charge and discharge to the capacitive element C1 as illustrated in FIG. 2 and FIG. 3. As illustrated in FIG. 6, the voltage detector DET converts fluctuations in the electric current $I_0$ depending on the AC rectangular wave Sg into fluctuations in the voltage (a waveform $V_0$ indicated by a solid line).

By contrast, in the state where a finger is in contact (or in proximity) with a device (a contact state), capacitance C2 generated by the finger is in contact or in proximity with the touch detection electrode E2 as illustrated in FIG. 4. This blocks capacitance of a fringe between the drive electrode E1 and the touch detection electrode E2. As a result, the capacitive element C1' having a capacitance value smaller than that of the capacitive element C1 is obtained. In the equivalent circuit illustrated in FIG. 5, an electric current $I_1$ flows through the capacitive element C1'. As illustrated in FIG. 6, the voltage detector DET converts fluctuations in the electric current $I_1$ depending on the AC rectangular wave Sg into fluctuations in the voltage (a waveform $V_1$ indicated by a dotted line). In this case, the waveform $V_1$ has amplitude smaller than that of the waveform $V_0$. Thus, an absolute value $|\Delta V|$ of the voltage difference between the waveform $V_0$ and the waveform $V_1$ varies depending on an influence of an object, such as a finger, approaching the device from the outside. To detect the absolute value $|\Delta V|$ of the voltage difference between the waveform $V_0$ and the waveform $V_1$ with high accuracy, the voltage detector DET preferably operates while providing a period Reset for resetting charge and discharge of a capacitor based on the frequency of the AC rectangular wave Sg by performing switching in the circuit.

The touch detecting device 30 illustrated in FIG. 1 performs sequential scanning on each detection block based on the drive signal Vcom (touch drive signal Vcomt, which will be described later) supplied from the drive electrode driver 14, thereby performing touch detection.

The touch detecting device 30 outputs the touch detection signal Vdet for each detection block from a plurality of touch detection electrodes TDL, which will be described later, via the voltage detector DET illustrated in FIG. 3 or FIG. 5, thereby supplying the touch detection signal Vdet to the touch detection signal amplifier 42 of the touch detecting unit 40.

The A/D converter 43 is a circuit that samples an analog signal output from the touch detection signal amplifier 42 at a timing synchronized with the drive signal Vcom, thereby converting the analog signal into a digital signal.

The signal processing unit 44 includes a digital filter. The digital filter reduces frequency components (noise components) other than the frequency at which the drive signal Vcom is sampled included in the output signal of the A/D converter 43. The signal processing unit 44 is a logic circuit that detects whether a touch is made on the touch detecting device 30 based on the output signal from the A/D converter 43. The signal processing unit 44 performs processing for extracting only the voltage difference caused by the finger. The voltage difference caused by the finger corresponds to the absolute value $|\Delta V|$ of the difference between the waveform $V_0$ and the waveform $V_1$. The signal processing unit 44 may perform an arithmetic operation for averaging the absolute value $|\Delta V|$ per detection block, thereby deriving the average value of the absolute value $|\Delta V|$. Thus, the signal processing unit 44 can reduce an influence caused by noise. The signal processing unit 44 compares the detected voltage difference caused by the finger with a predetermined threshold voltage. If the voltage difference is equal to or larger than the threshold voltage, the signal processing unit 44 determines that an external proximity object approaching the device from the outside is in contact with the device. If the voltage difference is smaller than the threshold voltage, the signal processing unit 44 determines that the external proximity object is not in contact with the device. Thus, the touch detecting unit 40 can perform touch detection.

The coordinate extracting unit 45 is a logic circuit that derives, when a touch is detected by the signal processing unit 44, the touch panel coordinates of the touch. The detection timing control unit 46 performs control such that the A/D converter 43, the signal processing unit 44, and the coordinate extracting unit 45 operate in synchronization with one another. The coordinate extracting unit 45 outputs touch panel coordinates as a signal output Vout.

Module

Figure 7:
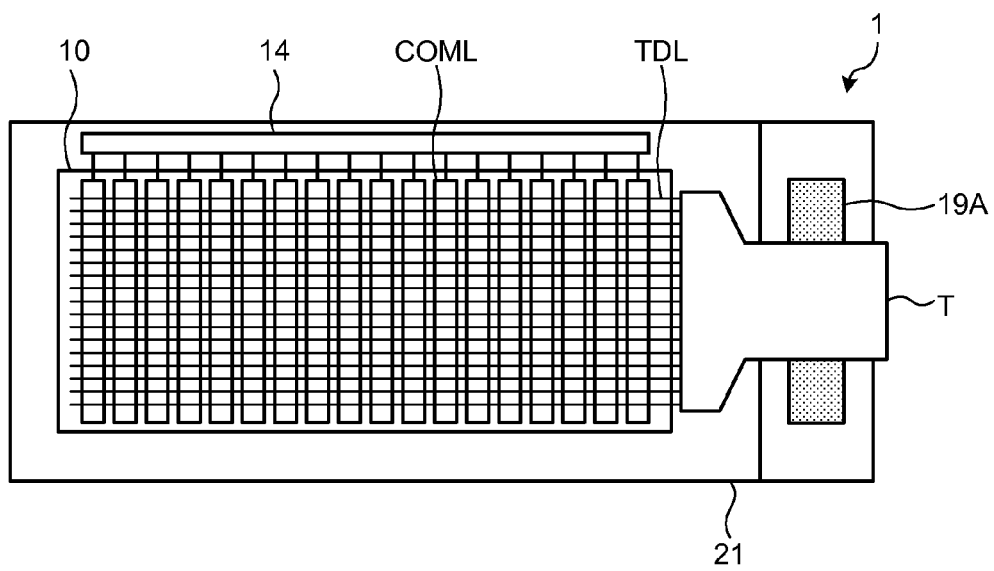
FIG. 7 is a view of an example of a module on which the display device with a touch detecting function is mounted.
Figure 8:
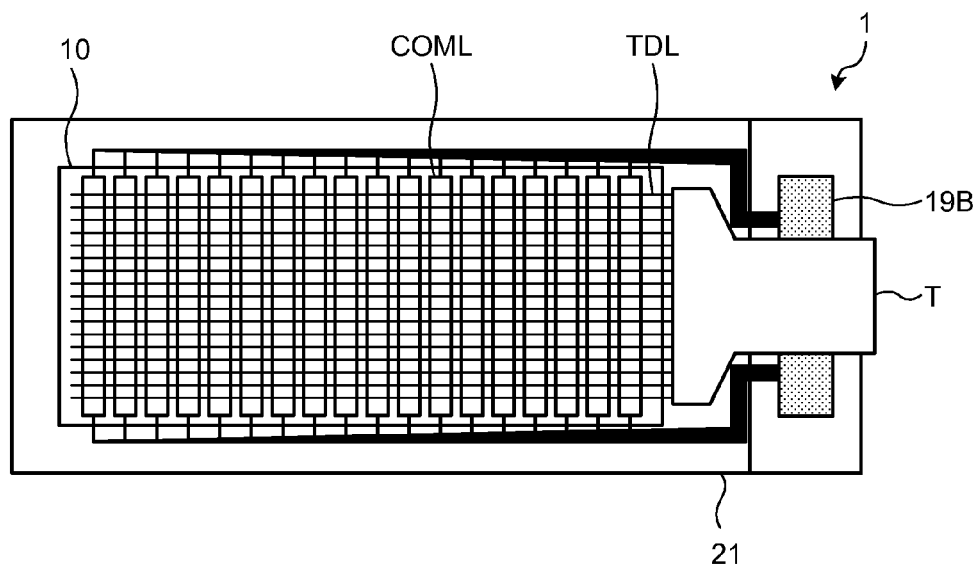
FIG. 8 is a view of another example of the module on which the display device with a touch detecting function is mounted.

FIGS. 7 and 8 are views of examples of a module on which the display device with a touch detecting function is mounted. To mount the display device 1 with a touch detecting function on the module, the drive electrode driver 14 may be formed above a thin-film transistor (TFT) substrate 21, which is a glass substrate, as illustrated in FIG. 7.

As illustrated in FIG. 7, the display device 1 with a touch detecting function includes the display unit 10 with a touch detecting function, the drive electrode driver 14, and a chip on glass (COG) 19A. FIG. 7 schematically illustrates the drive electrodes COML and the touch detection electrodes TDL in the display unit 10 with a touch detecting function viewed in a direction perpendicular to the surface of the TFT substrate 21, which will be described later. The touch detection electrodes TDL are formed to intersect with the drive electrodes COML in a grade separated manner. In other words, the drive electrodes COML are formed in a direction along one side of the display unit 10 with a touch detecting function, whereas the touch detection electrodes TDL are formed in a direction along the other side of the display unit 10 with a touch detecting function. The output terminal of the touch detection electrodes TDL is provided at an end in the other side direction of the display unit 10 with a touch detecting function. The output terminal is coupled to the touch detecting device 40 mounted on the outside of the module via a terminal T formed of a flexible substrate or the like. The drive electrode driver 14 is formed on the TFT substrate 21, which is a glass substrate. The COG 19A is a chip mounted on the TFT substrate 21 and includes circuits required for a display operation, such as the control unit 11, the gate driver 12, and the source driver 13 illustrated in FIG. 1. In the display device 1 with a touch detecting function, the drive electrode driver 14 may be included in a COG as illustrated in FIG. 8.

The module, on which the display device 1 with a touch detecting function is mounted, includes a COG 19B as illustrated in FIG. 8. The COG 19B illustrated in FIG. 8 includes the drive electrode driver 14 besides the circuits required for a display operation described above. The display device 1 with a touch detecting function performs line-sequential scanning on each horizontal line in a display operation, which will be described later. By contrast, the display device 1 with a touch detecting function sequentially applies the drive signal Vcom to the drive electrodes COML in a touch detection operation, thereby performing line-sequential scanning on each detection line.

Display Unit with a Touch Detecting Function

Figure 9:
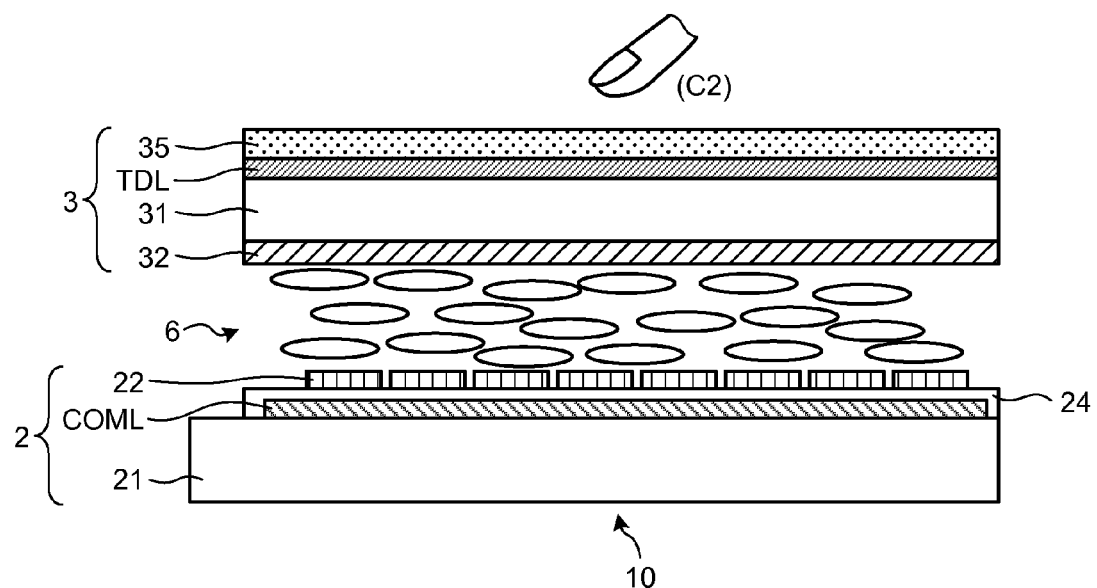
FIG. 9 is a sectional view of a schematic sectional structure of a display unit with a touch detecting function according to the first embodiment.
Figure 10:
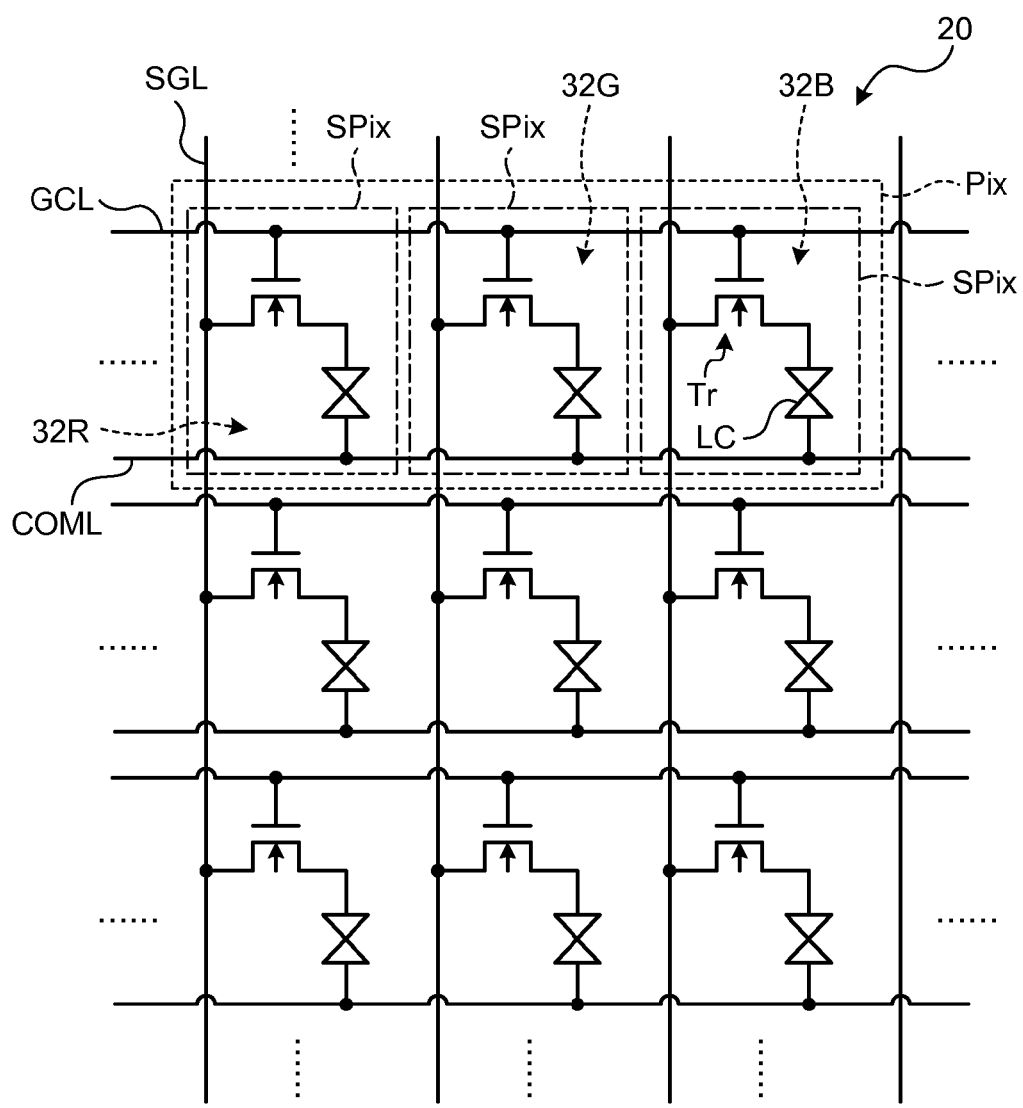
FIG. 10 is a circuit diagram of pixel arrangement of the display unit with a touch detecting function according to the first embodiment.

The following describes an exemplary configuration of the display unit 10 with a touch detecting function in greater detail. FIG. 9 is a sectional view of a schematic sectional structure of the display unit with a touch detecting function according to the first embodiment. FIG. 10 is a circuit diagram of pixel arrangement of the display unit with a touch detecting function according to the first embodiment. The display unit 10 with a touch detecting function includes a pixel substrate 2, a counter substrate 3, and a liquid-crystal layer 6. The counter substrate 3 is arranged in a manner facing the surface of the pixel substrate 2 in a perpendicular direction. The liquid-crystal layer 6 is inserted between the pixel substrate 2 and the counter substrate 3.

The pixel substrate 2 includes the TFT substrate 21, a plurality of pixel electrodes 22, a plurality of drive electrodes COML, and an insulation layer 24. The TFT substrate 21 serves as a circuit board. The pixel electrodes 22 are arranged in a matrix above the TFT substrate 21. The drive electrodes COML are formed between the TFT substrate 21 and the pixel electrodes 22. The insulation layer 24 electrically insulates the pixel electrodes 22 from the drive electrodes COML. The TFT substrate 21 is provided with a thin-film transistor (TFT) element Tr of each sub-pixel SPix illustrated in FIG. 10 and wiring, such as a signal line SGL and a scanning line GCL. The signal line SGL supplies the pixel signal Vpix to each pixel electrode 22 illustrated in FIG. 9, whereas the scanning line GCL drives each TFT element Tr. Thus, the signal line SGL extends on a plane parallel to the surface of the TFT substrate 21 and supplies the pixel signal Vpix used to display an image to a pixel. The liquid-crystal display unit 20 illustrated in FIG. 10 includes a plurality of sub-pixels SPix arranged in a matrix. The sub-pixels Spix each include the TFT element Tr and a liquid-crystal element LC. The TFT element Tr is formed of a thin-film transistor, and specifically of an n-channel metal oxide semiconductor (MOS) TFT in this example. One of the source and the drain of the TFT element Tr is coupled to the signal line SGL, the gate thereof is coupled to the scanning line GCL, and the other of the source and the drain thereof is coupled to one end of the liquid-crystal element LC. One end of the liquid-crystal element LC is coupled to the drain of the TFT element Tr, whereas the other end thereof is coupled to the drive electrode COML, for example.

The sub-pixel SPix illustrated in FIG. 10 is coupled to other sub-pixels SPix belonging to the same row in the liquid-crystal display unit 20 by the scanning line GCL. The scanning line GCL is coupled to the gate driver 12 and is supplied with the scanning signal Vscan from the gate driver 12. The sub-pixel SPix is further coupled to other sub-pixels SPix belonging to the same column in the liquid-crystal display unit 20 by the signal line SGL. The signal line SGL is coupled to the source driver 13 and is supplied with the pixel signal Vpix from the source driver 13. The sub-pixel SPix is further coupled to the other sub-pixels SPix belonging to the same row in the liquid-crystal display unit 20 by the drive electrode COML. The drive electrode COML is coupled to the drive electrode driver 14 and is supplied with the drive signal Vcom from the drive electrode driver 14. In other words, a plurality of sub-pixels SPix belonging to the same row share a single drive electrode COML in this example. The direction in which the drive electrode COML extends according to the first embodiment is parallel to the direction in which the scanning line GCL extends. The direction in which the drive electrode COML extends according to the first embodiment is not limited thereto. The direction in which the drive electrode COML extends may be a direction parallel to the direction in which the signal line SGL extends, for example.

The gate driver 12 illustrated in FIG. 1 applies the scanning signal Vscan to the gate of the TFT element Tr of a pixel Pix via the scanning line GCL illustrated in FIG. 10. Thus, the gate driver 12 sequentially selects a row (a horizontal line) out of the sub-pixels SPix arranged in a matrix in the liquid-crystal display unit 20 as a target of display drive. The source driver 13 illustrated in FIG. 1 supplies the pixel signal Vpix to each of the sub-pixels SPix constituting the horizontal line sequentially selected by the gate driver 12 via the signal line SGL illustrated in FIG. 10. These sub-pixels SPix perform display of the horizontal line based on the supplied pixel signal Vpix. The drive electrode driver 14 illustrated in FIG. 1 applies the drive signal Vcom, thereby driving the drive electrodes COML of each block composed of a predetermined number of drive electrodes COML illustrated in FIG. 7 and FIG. 8.

As described above, the gate driver 12 drives so as to perform time-division line-sequential scanning on the scanning line GCL, whereby the liquid-crystal display unit 20 sequentially selects a horizontal line. The source driver 13 supplies the pixel signal Vpix to the sub-pixels SPix belonging to the horizontal line, whereby the liquid-crystal display unit 20 performs display of the horizontal line. To perform the display operation, the drive electrode driver 14 applies the drive signal Vcom to a block including the drive electrodes COML corresponding to the horizontal line.

Figure 11:
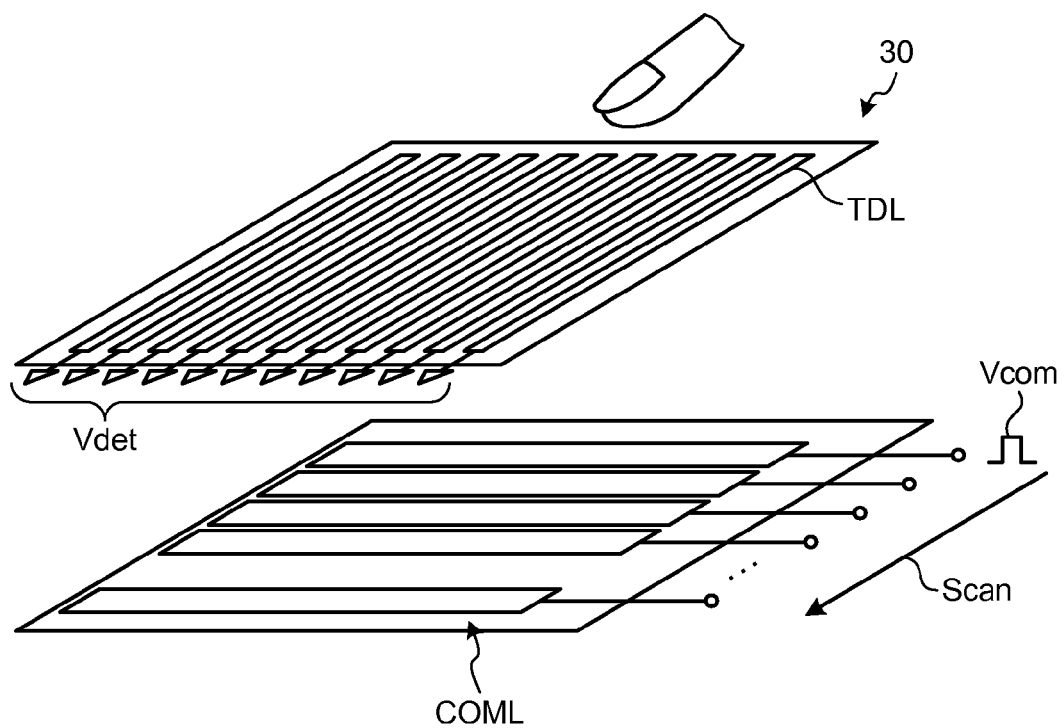
FIG. 11 is a perspective view of an exemplary configuration of drive electrodes and touch detection electrodes of the display device with a touch detecting function according to the first embodiment.

The drive electrode COML according to the present embodiment functions as a drive electrode of the liquid-crystal display unit 20 and as a drive electrode of the touch detecting device 30. FIG. 11 is a perspective view of an exemplary configuration of the drive electrodes and the touch detection electrodes of the display device with a touch detecting function according to the present embodiment. The drive electrodes COML illustrated in FIG. 11 face the pixel electrodes 22 in the direction perpendicular to the surface of the TFT substrate 21 as illustrated in FIG. 9. The touch detecting device 30 includes the drive electrodes COML provided to the pixel substrate 2 and the touch detection electrodes TDL provided to the counter substrate 3. The touch detection electrodes TDL are formed into stripe-like electrode patterns extending in a direction intersecting with the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled to the input terminal of the touch detection signal amplifier 42 of the touch detecting unit 40. The electrode patterns of the drive electrodes COML and the touch detection electrodes TDL intersecting with each other generate capacitance at the intersections.

With this configuration, the touch detecting device 30 performs a touch detection operation by driving the drive electrode driver 14 so as to perform time-division line-sequential scanning on drive electrode blocks. As a result, the touch detecting device 30 sequentially selects a detection block of the drive electrodes COML in a scanning direction Scan. The touch detecting device 30 then outputs the touch detection signal Vdet from the touch detection electrodes TDL. Thus, the touch detecting device 30 performs touch detection in the detection block. In other words, the drive electrode block corresponds to the drive electrode E1 in the basic principle of touch detection described above, whereas the touch detection electrode TDL corresponds to the touch detection electrode E2. The touch detecting device 30 detects a touch in accordance with the basic principle. As illustrated in FIG. 11, the electrode patterns intersecting with each other form a capacitive touch sensor in a matrix. Scanning the entire touch detection surface of the touch detecting device 30 enables detection of the position where the external proximity object is in contact or in proximity with the device.

The liquid-crystal layer 6 modulates light passing therethrough depending on the state of an electric field. The liquid-crystal layer 6 is provided with liquid crystals of a lateral electric-field mode, such as a fringe field switching (FFS) mode and an in-plane switching (IPS) mode. An orientation film may be provided between the liquid-crystal layer 6 and the pixel substrate 2 and between the liquid-crystal layer 6 and the counter substrate 3 illustrated in FIG. 9.

The counter substrate 3 includes a glass substrate 31 and a color filter 32 formed at one surface of the glass substrate 31. The touch detection electrode TDL serving as the detection electrode of the touch detecting device 30 is formed at the other surface of the glass substrate 31. A polarization plate 35 is provided above the touch detection electrode TDL.

In the color filter 32 illustrated in FIG. 9, color areas of the color filter colored with three colors of red (R), green (G), and blue (B) are periodically arranged, for example. Color areas 32R, 32G, and 32B (refer to FIG. 10) colored with the three colors of R, G, and B, respectively, are associated with the sub-pixels SPix illustrated in FIG. 10. The color areas 32R, 32G, and 32B serve as a group to form the pixel Pix. The pixels Pix are arranged in a matrix along a direction parallel to the scanning line GCL and a direction parallel to the signal line SGL, thereby forming a display area Ad, which will be described later. The color filter 32 faces the liquid-crystal layer 6 in the direction perpendicular to the TFT substrate 21. Thus, the sub-pixel SPix can display a single color. The color filter 32 may have another color combination as long as the color areas are colored with colors different from one another. The color filter 32 is not necessarily provided. There may be an area in which the color filter 32 is not present, that is, a translucent sub-pixel SPix.

The glass substrate 31 corresponds to a specific example of a "substrate" in the present disclosure. The color areas 32R, 32G, and 32B correspond to a specific example of a "color area" in the present disclosure. The pixel Pix corresponds to a specific example of a "pixel" in the present disclosure. The display area Ad corresponds to a specific example of a "display area" in the present disclosure. The touch detection electrode TDL corresponds to a specific example of a "touch detection electrode" in the present disclosure. A conductive thin wire ML corresponds to a specific example of a "first conductive thin wire" in the present disclosure. A dummy electrode TDD corresponds to a specific example of a "dummy electrode" in the present disclosure. A conductive thin wire DL corresponds to a specific example of a "second conductive thin wire" in the present disclosure. The drive electrode COML corresponds to a specific example of a "drive electrode" in the present disclosure. The liquid-crystal layer 6 corresponds to a specific example of a "display functional layer" in the present disclosure.

1-1B. Operation and Action

The following describes an operation and action of the display device 1 with a touch detecting function according to the first embodiment.

The drive electrode COML functions as a common drive electrode of the liquid-crystal display unit 20 and as a drive electrode of the touch detecting device 30. As a result, the drive signal Vcom may possibly affect both the liquid-crystal display unit 20 and the touch detecting device 30. To address this, the drive signal Vcom is applied to the drive electrode COML separately in a display period B to perform a display operation and in a touch detection period A to perform a touch detection operation. The drive electrode driver 14 applies the drive signal Vcom as a display drive signal in the display period B to perform a display operation. The drive electrode driver 14 applies the drive signal Vcom as a touch drive signal in the touch detection period A to perform a touch detection operation. In the description below, the drive signal Vcom serving as the display drive signal is referred to as a display drive signal Vcomd, whereas the drive signal Vcom serving as the touch drive signal is referred to as a touch drive signal Vcomt.

Outline of the Entire Operation

Based on the video signal Vdisp supplied from the outside, the control unit 11 supplies control signals to the gate driver 12, the source driver 13, the drive electrode driver 14, and the touch detecting unit 40, thereby controlling these units so as to operate in synchronization with one another. The gate driver 12 supplies the scanning signal Vscan to the liquid-crystal display unit 20 in the display period B, thereby sequentially selecting a horizontal line to be a target of display drive. The source driver 13 supplies the pixel signal Vpix to each pixel Pix constituting the horizontal line selected by the gate driver 12 in the display period B.

In the display period B, the drive electrode driver 14 applies the display drive signal Vcomd to a drive electrode block relating to the horizontal line. In the touch detection period A, the drive electrode driver 14 sequentially applies the touch drive signal Vcomt to a drive electrode block relating to the touch detection operation, thereby sequentially selecting one detection block. The display unit 10 with a touch detecting function performs a display operation based on the signals supplied from the gate driver 12, the source driver 13, and the drive electrode driver 14 in the display period B. The display unit 10 with a touch detecting function performs a touch detection operation based on the signal supplied from the drive electrode driver 14 and outputs the touch detection signal Vdet from the touch detection electrode TDL in the touch detection period A. The touch detection signal amplifier 42 amplifies and outputs the touch detection signal Vdet. The A/D converter 43 converts the analog signal output from the touch detection signal amplifier 42 into a digital signal at a timing synchronized with the touch drive signal Vcomt. The signal processing unit 44 detects whether a touch is made on the touch detecting device 30 based on the output signal from the A/D converter 43. The coordinate extracting unit 45 derives, when a touch is detected by the signal processing unit 44, the touch panel coordinates of the touch. The control unit 11 controls the detection timing control unit 46 to change the sampling frequency of the touch drive signal Vcomt.

Specific Operation

Figure 12:
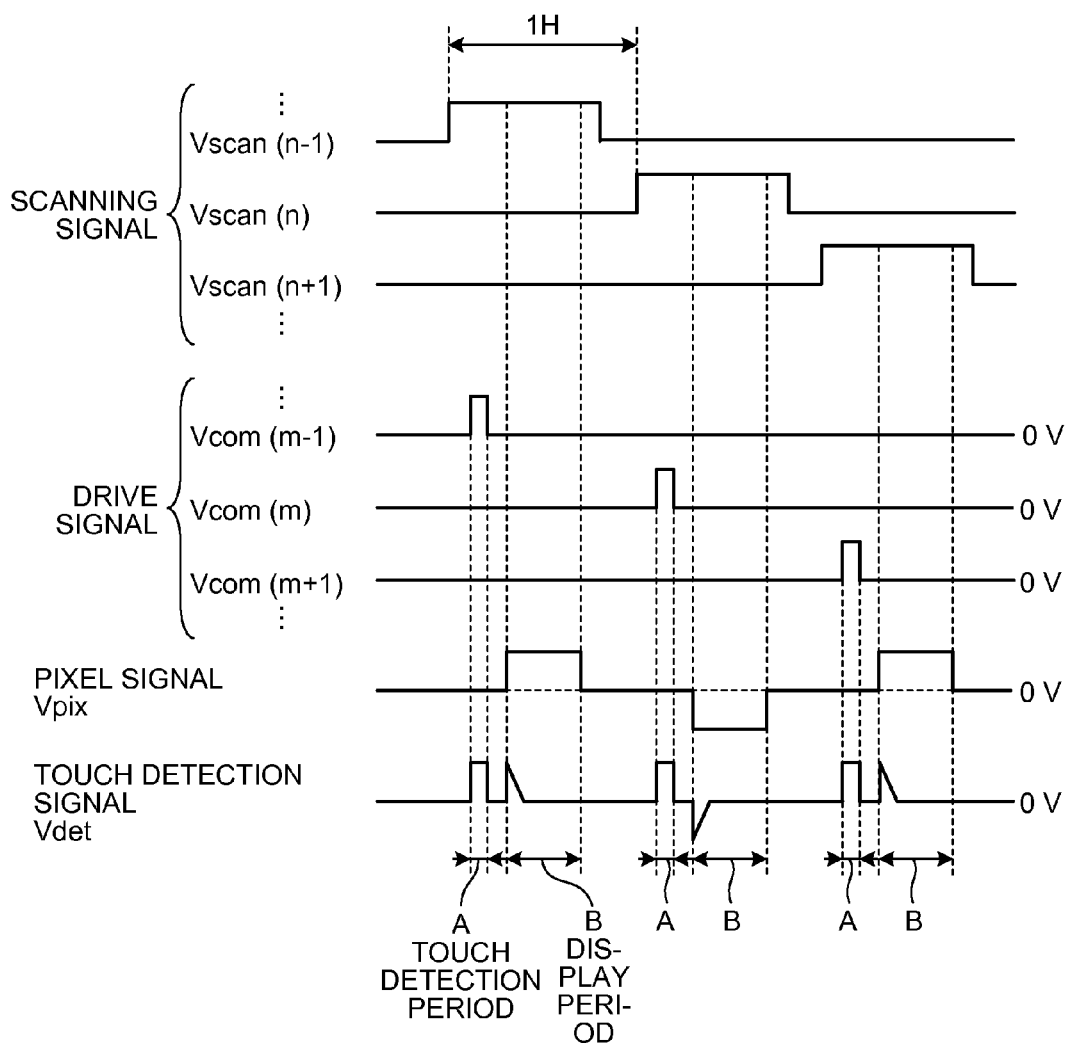
FIG. 12 is a timing waveform chart of an exemplary operation of the display device with a touch detecting function according to the first embodiment.

The following describes a specific operation of the display device 1 with a touch detecting function. FIG. 12 is a timing waveform chart of an exemplary operation of the display device with a touch detecting function according to the first embodiment. As illustrated in FIG. 12, the liquid-crystal display unit 20 performs sequential scanning on each horizontal line of successive scanning lines GCL of the (n−1)-th row, the n-th row, and the (n+1)-th row among the scanning lines GCL based on the scanning signal Vscan supplied from the gate driver 12, thereby performing display. Similarly, the drive electrode driver 14 supplies the drive signal Vcom to successive drive electrodes COML of the (m−1)-th column, the m-th column, and the (m+1)-th column among the drive electrodes COML of the display unit 10 with a touch detecting function based on the control signal supplied from the control unit 11.

As described above, the display device 1 with a touch detecting function performs the touch detection operation (touch detection period A) and the display operation (display period B) in a time-division manner in each display horizontal period (1H). In the touch detection operation, the display device 1 with a touch detecting function selects a different drive electrode COML and applies the drive signal Vcom thereto in each display horizontal period 1H, thereby performing scanning for touch detection. The following describes the operation in greater detail.

The gate driver 12 applies the scanning signal Vscan to the scanning line GCL of the (n−1)-th row, thereby changing a scanning signal Vscan(n−1) from a low level to a high level. This starts a display horizontal period 1H.

In the touch detection period A, the drive electrode driver 14 applies the touch drive signal Vcomt to the drive electrode COML of the (m−1)-th column, thereby changing a drive signal Vcom(m−1) from a low level to a high level. The drive signal Vcom(m−1) is transmitted to the touch detection electrode TDL via capacitance, thereby changing the touch detection signal Vdet. When the drive signal Vcom(m−1) changes from the high level to the low level, the touch detection signal Vdet changes in the same manner. The waveform of the touch detection signal Vdet in the touch detection period A corresponds to the touch detection signal Vdet in the basic principle of touch detection described above. The A/D converter 43 carries out A/D conversion on the touch detection signal Vdet in the touch detection period A, thereby performing touch detection. Thus, the display device 1 with a touch detecting function performs touch detection of one detection line.

In the display period B, the source driver 13 applies the pixel signal Vpix to the signal line SGL, thereby performing display of a horizontal line. The drive electrode driver 14 applies the display drive signal Vcomd to the drive electrode COML as a common potential. At this time, the potential of the display drive signal Vcomd is the same as that of the low level of the touch drive signal Vcomt in the touch detection period A, for example. As illustrated in FIG. 12, the change in the pixel signal Vpix is transmitted to the touch detection electrode TDL via parasitic capacitance, thereby changing the touch detection signal Vdet. In the display period B, however, the A/D converter 43 carries out no A/D conversion, which makes it possible to suppress an influence of the change in the pixel signal Vpix on touch detection. After the source driver 13 completes supplying the pixel signal Vpix, the gate driver 12 changes the scanning signal Vscan(n−1) of the scanning line GCL of the (n−1)-th row from the high level to the low level. Thus, the display horizontal period 1H is terminated.

Subsequently, the gate driver 12 applies the scanning signal Vscan to the scanning line GCL of the n-th row, which is different from the previous scanning line GCL, thereby changing a scanning signal Vscan(n) from a low level to a high level. This starts a next display horizontal period 1H.

In the subsequent touch detection period A, the drive electrode driver 14 applies the drive signal Vcom to the drive electrode COML of the m-th column, which is different from the previous drive electrode COML. The A/D converter 43 carries out A/D conversion on the change in the touch detection signal Vdet, thereby performing touch detection of the detection line.

In the display period B, the source driver 13 applies the pixel signal Vpix to the signal line SGL, thereby performing display of another horizontal line. The display device 1 with a touch detecting function according to the present embodiment performs dot inversion drive. As a result, the polarity of the pixel signal Vpix applied by the source driver 13 is inverted from that in the previous display horizontal period 1H. After the display period B is terminated, the current display horizontal period 1H is terminated.

By repeating the operation described above, the display device 1 with a touch detecting function performs a display operation by scanning the entire display surface and performs a touch detection operation by scanning the entire touch detection surface.

The display device 1 with a touch detecting function performs the touch detection operation in the touch detection period A and performs the display operation in the display period B in a display horizontal period (1H). Because the touch detection operation and the display operation are performed separately in the respective periods, the display device 1 with a touch detecting function can perform both the display operation and the touch detection operation in a single display horizontal period 1H. In addition, it is possible to suppress an influence of the display operation on the touch detection.

Arrangement of the Touch Detection Electrode

Figure 13:
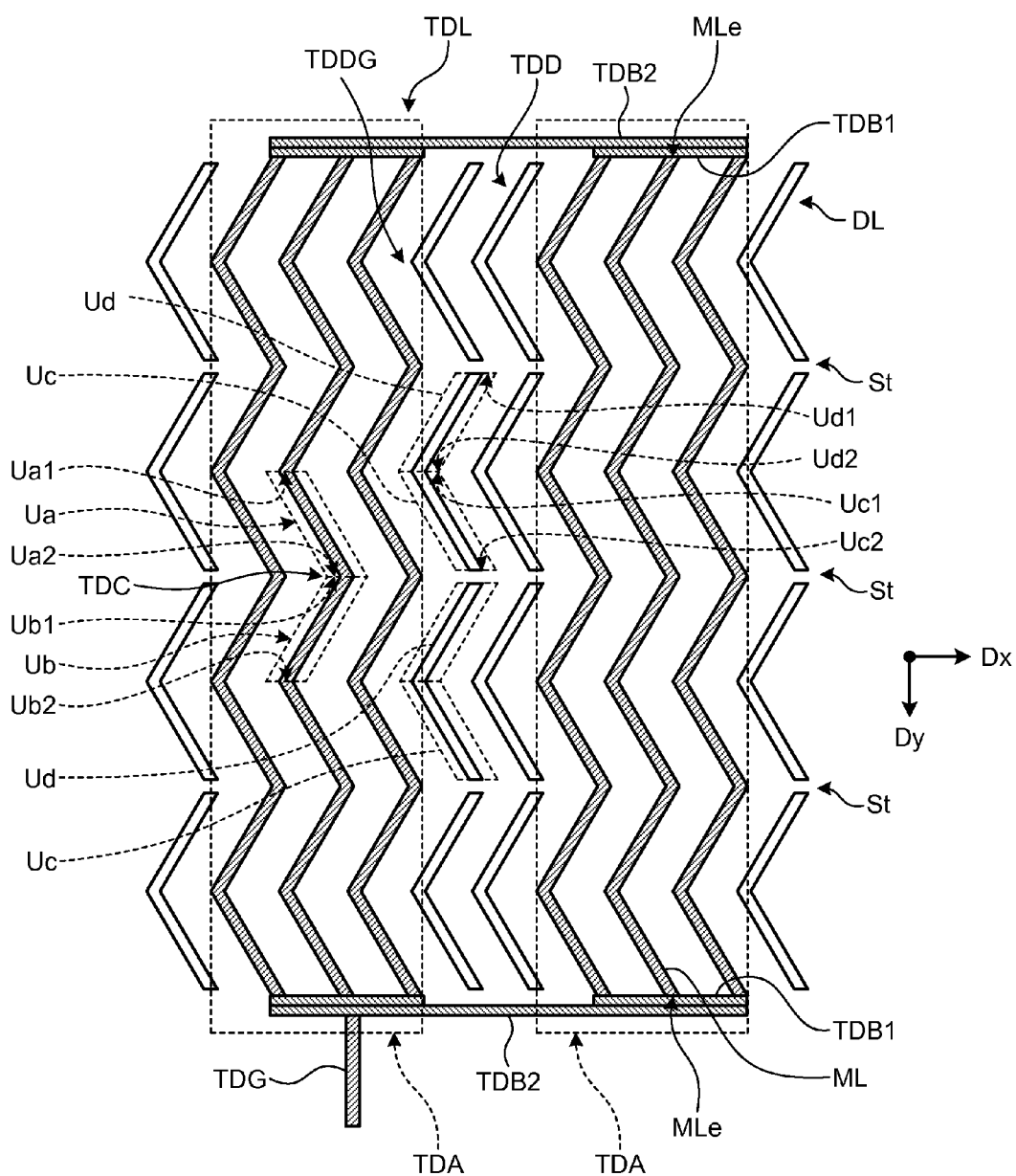
FIG. 13 is a schematic of arrangement of a touch detection electrode and a dummy electrode according to the first embodiment.

FIG. 13 is a schematic of arrangement of the touch detection electrode and the dummy electrode according to the first embodiment. As illustrated in FIG. 13, the touch detection electrode TDL according to the first embodiment includes a plurality of conductive thin wires ML extending in a pixel array direction Dy (a first direction) on a plane parallel to the counter substrate 3. The conductive thin wires ML are coupled to one another at respective ends MLe via a first conductive part TDB1 and belong to an area TDA. In the area TDA, the conductive thin wires ML establish electrical continuity with one another and extend with a constant gap interposed therebetween. A plurality of areas TDA extend with a constant gap interposed therebetween. In the areas TDA, the respective first conductive parts TDB1 are coupled to each other via a second conductive part TDB2, thereby establishing electrical continuity therebetween. The second conductive part TDB2 is coupled to the touch detecting unit 40 illustrated in FIG. 1 via detection wiring TDG. The first conductive part TDB1 and the second conductive part TDB2 are made of the same material as that of the conductive thin wire ML. This configuration can make the conductive thin wire ML hard to recognize. In addition, touch detection of a certain area is performed with the conductive thin wires ML. This can reduce the resistance generated in the touch detection.

The conductive thin wire ML includes a thin wire piece Ua and a thin wire piece Ub. The thin wire piece Ua is a pattern made of a conductive material extending at an angle with respect to the pixel array direction Dy. The thin wire piece Ua includes a first end Ua1 and a second end Ua2. Similarly, the thin wire piece Ub is a pattern made of a conductive material extending in a direction different from the direction in which the thin wire piece Ua extends. The thin wire piece Ub includes a first end Ub1 and a second end Ub2. The thin wire piece Ua and the thin wire piece Ub are connected to each other at the second end Ua2 of the thin wire piece Ua and the first end Ub1 of the thin wire piece Ub, thereby establishing electrical continuity therebetween.

The connecting portion between the second end Ua2 of the thin wire piece Ua and the first end Ub1 of the thin wire piece Ub serves as a bent portion TDC of the conductive thin wire ML. The thin wire piece Ua and the thin wire piece Ub are bent at a predetermined angle at each bent portion TDC. In the conductive thin wire ML according to the first embodiment, the length of the thin wire piece Ua is equal to that of the thin wire piece Ub, for example. The magnitude of the angle of the direction in which the thin wire piece Ua extends with respect to the pixel array direction Dy is equal to the magnitude of the angle of the direction in which the thin wire piece Ub extends with respect to the pixel array direction Dy. The conductive thin wire ML according to the first embodiment changes the direction inclined in a pixel orthogonal direction Dx (a second direction) at each bent portion TDC. The width of the thin wire piece Ua and the thin wire piece Ub preferably falls within a range of 1 µm to 10 µm depending on the pixel size. Alternatively, the width of the thin wire piece Ua and the thin wire piece Ub may be one-fortieth of the short side of the pixel Pix to one-tenth of the short side of the pixel Pix. If the width of the thin wire piece Ua and the thin wire piece Ub is larger than 10 µm, the thin wire piece Ua and the thin wire piece Ub are likely to be visually recognized by a person. If the width of the thin wire piece Ua and the thin wire piece Ub is smaller than 1 µm, the resistance may possibly be increased, or the pattern of the thin wire piece Ua and the thin wire piece Ub may possibly be broken in a manufacturing process.

The conductive thin wire ML of the touch detection electrode TDL is made of a conductive metal material, specifically, a metal material of aluminum (Al), copper (Cu), silver (Ag), molybdenum (Mo), chromium (Cr), and tungsten (W), and alloys of these. Alternatively, the conductive thin wire ML of the touch detection electrode TDL is made of aluminum (Al), copper (Cu), silver (Ag), molybdenum (Mo), chromium (Cr), and tungsten (W), and oxides (a metal oxide) of these and has conductivity. The conductive thin wire ML may be obtained by patterning a laminated body in which at least one of the metal material and the metal oxide described above is laminated. Alternatively, the conductive thin wire ML may be obtained by patterning a laminated body in which at least one of the metal material, the metal oxide described above and a translucent conductive oxide, such as an indium tin oxide (ITO), serving as a material of a translucent electrode is laminated. The conductive thin wire ML has resistance lower than that of a translucent conductive oxide, such as an ITO, serving as a material of a translucent electrode. The material of the conductive thin wire ML has transmittance lower than that of an ITO in the same film thickness. The material of the conductive thin wire ML may have transmittance of equal to or lower than 10%, for example.

As illustrated in FIG. 13, the areas TDA are arranged with the constant gap interposed therebetween. An area in which the conductive thin wire ML is arranged in the touch detection electrode TDL is different in the light-shielding property from an area in which no conductive thin wire ML is arranged in the touch detection electrode TDL. This may possibly make the touch detection electrode TDL easy to visually recognize. To address this, the dummy electrode TDD not connected to the detection wiring TDG is arranged between the areas TDA adjacent to each other on the counter substrate 3. The dummy electrode TDD is formed of a plurality of conductive thin wires DL made of the same material as that of the conductive thin wire ML of the touch detection electrode TDL. The conductive thin wire DL of the dummy electrode TDD may be made of a different material as long as the dummy electrode TDD has substantially the same light-shielding property as that of the touch detection electrode TDL. The material of the conductive thin wire DL has transmittance lower than that of an ITO in the same film thickness. The material of the conductive thin wire DL may have transmittance of equal to or lower than 10%, for example. The dummy electrode TDD is not connected to the detection wiring TDG.

The conductive thin wire DL illustrated in FIG. 13 includes a thin wire piece Uc and a thin wire piece Ud. The thin wire piece Uc is a pattern made of a conductive material extending at an angle with respect to the pixel array direction Dy. The thin wire piece Uc includes a first end Uc1 and a second end Uc2. Similarly, the thin wire piece Ud is a pattern made of a conductive material extending in a direction different from the direction in which the thin wire piece Uc extends. The thin wire piece Ud includes a first end Ud1 and a second end Ud2. The thin wire piece Uc has substantially the same size as that of the thin wire piece Ua and is arranged parallel to the direction in which the thin wire piece Ua extends. The thin wire piece Ud has substantially the same size as that of the thin wire piece Ub and is arranged parallel to the direction in which the thin wire piece Ub extends. This configuration reduces the difference in the light-shielding property between the area in which the touch detection electrode TDL is arranged and the area in which no touch detection electrode TDL is arranged. This can reduce the possibility that the touch detection electrode TDL is visually recognized. The connecting portion between the first end Uc1 of the thin wire piece Uc and the second end Ud2 of the thin wire piece Ud serves as a bent portion TDDG. The thin wire piece Uc and the thin wire piece Ud are bent at a predetermined angle at each bent portion TDDG. The width of the thin wire piece Uc and the thin wire piece Ud preferably falls within a range of 1 μm to 10 μm depending on the pixel size. Alternatively, the width of the thin wire piece Uc and the thin wire piece Ud may be one-fortieth of the short side of the pixel Pix to one-tenth of the short side of the pixel Pix. If the width of the thin wire piece Uc and the thin wire piece Ud is larger than 10 μm, the thin wire piece Uc and the thin wire piece Ud are likely to be visually recognized by a person. If the width of the thin wire piece Uc and the thin wire piece Ud is smaller than 1 μm, the resistance of the thin wire piece Ua and the thin wire piece Ub having substantially the same size may possibly be increased, or the pattern of the thin wire piece Uc and the thin wire piece Ud may possibly be broken in a manufacturing process.

The conductive thin wire DL of the dummy electrode TDD has a slit St serving as a dividing portion in which the same material as that of the conductive thin wire ML is not provided between the thin wire piece Uc and the thin wire piece Ud. The slit St prevents electrical continuity between the thin wire piece Uc and the thin wire piece Ud, thereby generating capacity difference between the dummy electrode and the touch detection electrode. If a finger is in proximity with both the touch detection electrode TDL and the dummy electrode TDD in touch detection, this configuration can reduce an influence caused by the dummy electrode TDD on the absolute value |ΔV| illustrated in FIG. 6. In the dummy electrode TDD, the slit St prevents electrical continuity between the thin wire piece Uc and the thin wire piece Ud and separates the thin wire piece Uc and the thin wire piece Ud. This can reduce an influence on touch detection accuracy.

Figure 14:
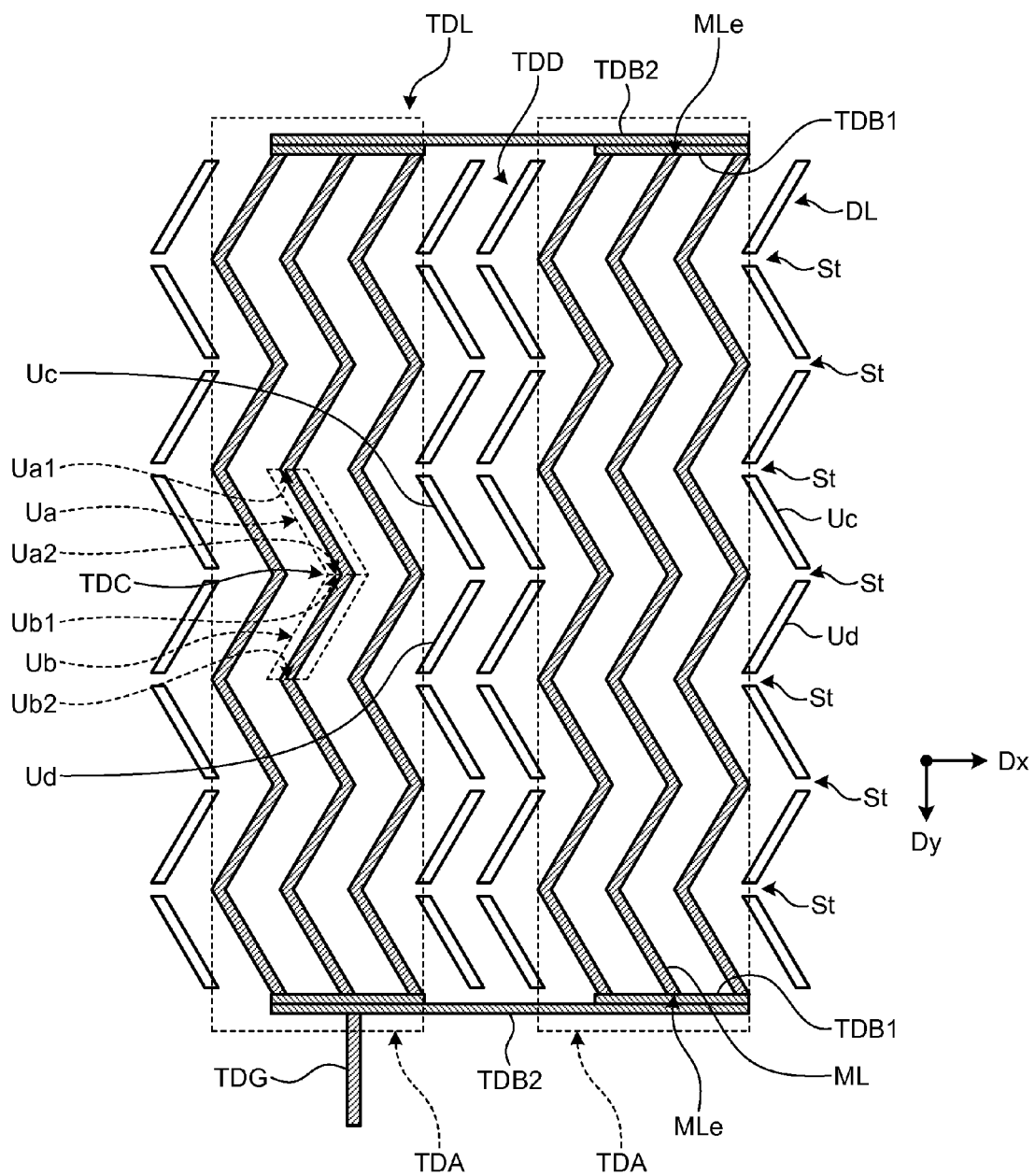
FIG. 14 is a schematic of arrangement of the touch detection electrode and the dummy electrode according to a modification of the first embodiment.

FIG. 14 is a schematic of arrangement of the touch detection electrode and the dummy electrode according to a modification of the first embodiment. The thin wire piece Uc is a pattern made of a conductive material extending at an angle with respect to the pixel array direction Dy. The thin wire piece Ud is a pattern made of a conductive material extending in a direction different from the direction in which the thin wire piece Uc extends. The thin wire piece Uc has substantially the same size as that of the thin wire piece Ua and is arranged parallel to the direction in which the thin wire piece Ua extends. The thin wire piece Ud has substantially the same size as that of the thin wire piece Ub and is arranged parallel to the direction in which the thin wire piece Ub extends. A slit St illustrated in FIG. 14 is also provided at the position of the bent portion TDDG illustrated in FIG. 13. The slit St illustrated in FIG. 14 is provided between the thin wire piece Uc and the thin wire piece Ud. The thin wire piece Uc and the thin wire piece Ud are bent at a predetermined angle at each slit St.

Figure 15:
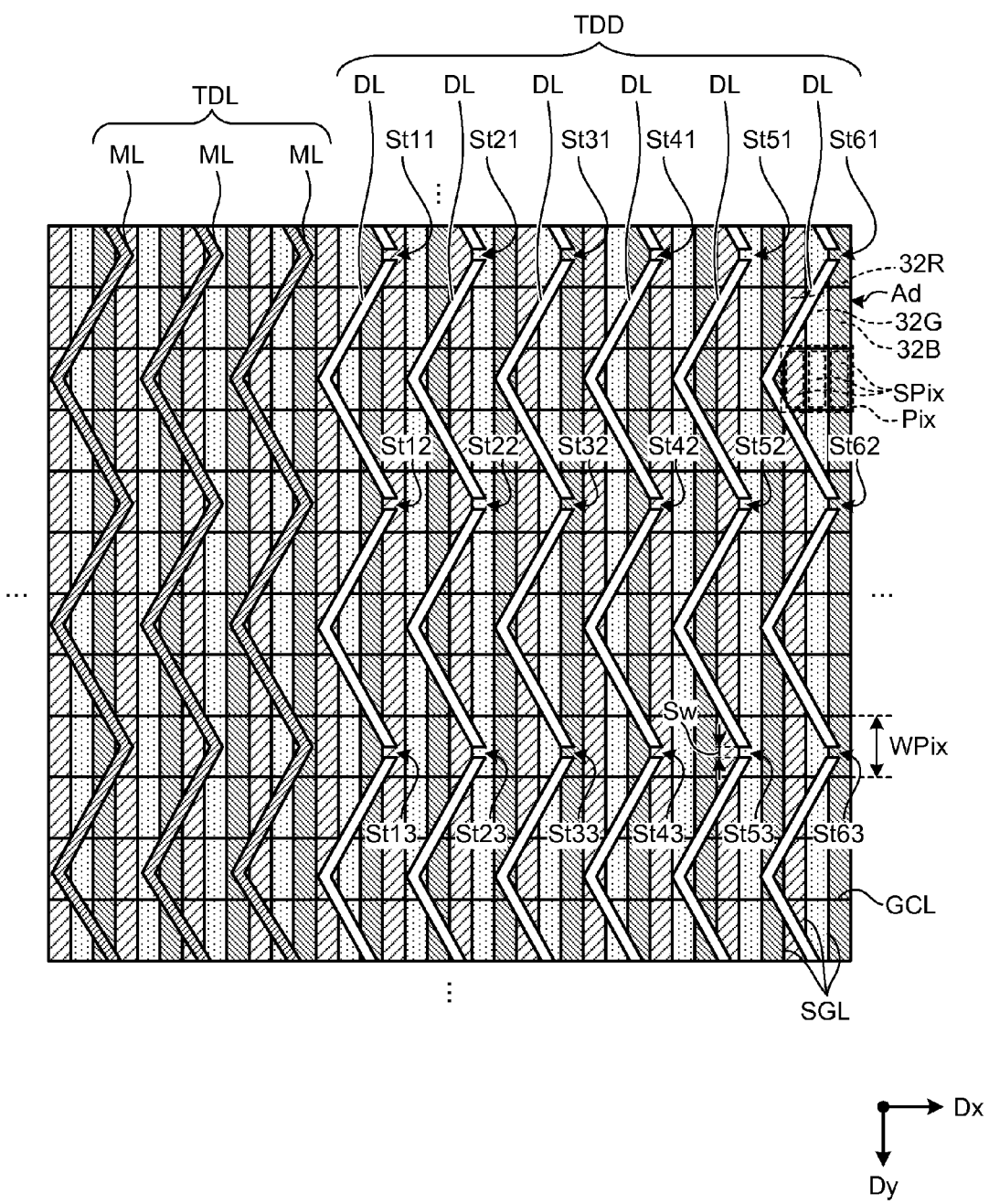
FIG. 15 is a view for explaining the positional relation between slits of the dummy electrode and color areas of a display area according to the first embodiment.

The following describes the pixel array direction Dy and the pixel orthogonal direction Dx illustrated in FIG. 13 and FIG. 14 with reference to FIG. 15. FIG. 15 is a view for explaining the positional relation between the slits of the dummy electrode and the color areas of the display area according to the first embodiment. As described above, the display area Ad includes a plurality of pixels Pix each formed of a group of the color areas 32R, 32G, and 32B associated with the respective sub-pixels SPix. The pixels Pix are arranged in a matrix along a direction parallel to the scanning line GCL and a direction parallel to the signal line SGL. The pixels Pix are arranged such that the color areas 32R, 32G, and 32B and the color areas 32R, 32G, and 32B adjacent thereto, respectively, are arranged side by side with the scanning line GCL interposed therebetween.

The pixel array direction Dy is a direction in which the color areas having the highest human visibility are aligned. The pixel orthogonal direction Dx is a direction orthogonal to the pixel array direction Dy on a plane parallel to the surface of the counter substrate 3. G (green) has the highest human visibility of the three colors of R (red), G (green), and B (blue). Because the color areas 32G are aligned in a direction parallel to the signal line SGL in FIG. 15, the pixel array direction Dy according to the first embodiment corresponds to the direction parallel to the signal line SGL. In a modification where W (white) is added and four colors of R (red), G (green), B (blue), and W (white) are used, W (white) has the highest human visibility.

As illustrated in FIG. 15, the conductive thin wire DL of the dummy electrode TDD according to the first embodiment includes a plurality of thin wire pieces extending in directions different from the pixel array direction Dy. The conductive thin wires DL are divided by slits St11, St12, St13, St21, St22, St23, St31, St32, St33, St41, St42, St43, St51, St52, St53, St61, St62, and St63 so as to have the area smaller than that of the conductive thin wire ML. The slits St11, St12, and St13 overlap with the color area 32R. The slits St21, St22, and St23 closest to the slits St11, St12, and St13 in the pixel orthogonal direction Dx overlap with the color area 32G. The color of the color area with which the slits St11, St12, and St13 overlap is different from that of the color area with which the slits St21, St22, and St23 overlap. The slits St31, St32, and St33 closest to the slits St21, St22, and St23 in the pixel orthogonal direction Dx overlap with the color area 32B. The color of the color area with which the slits St21, St22, and St23 overlap is different from that of the color area with which the slits St31, St32, and St33 overlap. The relation of the color areas with which the slits St41, St42, St43, St51, St52, St53, St61, St62, and St63 overlap is the same as that of the color areas with which the slits St11, St12, St13, St21, St22, St23, St31, St32, and St33 overlap.

A gap Sw between the slits St illustrated in FIG. 15 is smaller than a length WPix of the sub-pixel SPix in the pixel array direction Dy. This configuration reduces the possibility that the slit St overlaps across a plurality of sub-pixels SPix.

Figure 16:
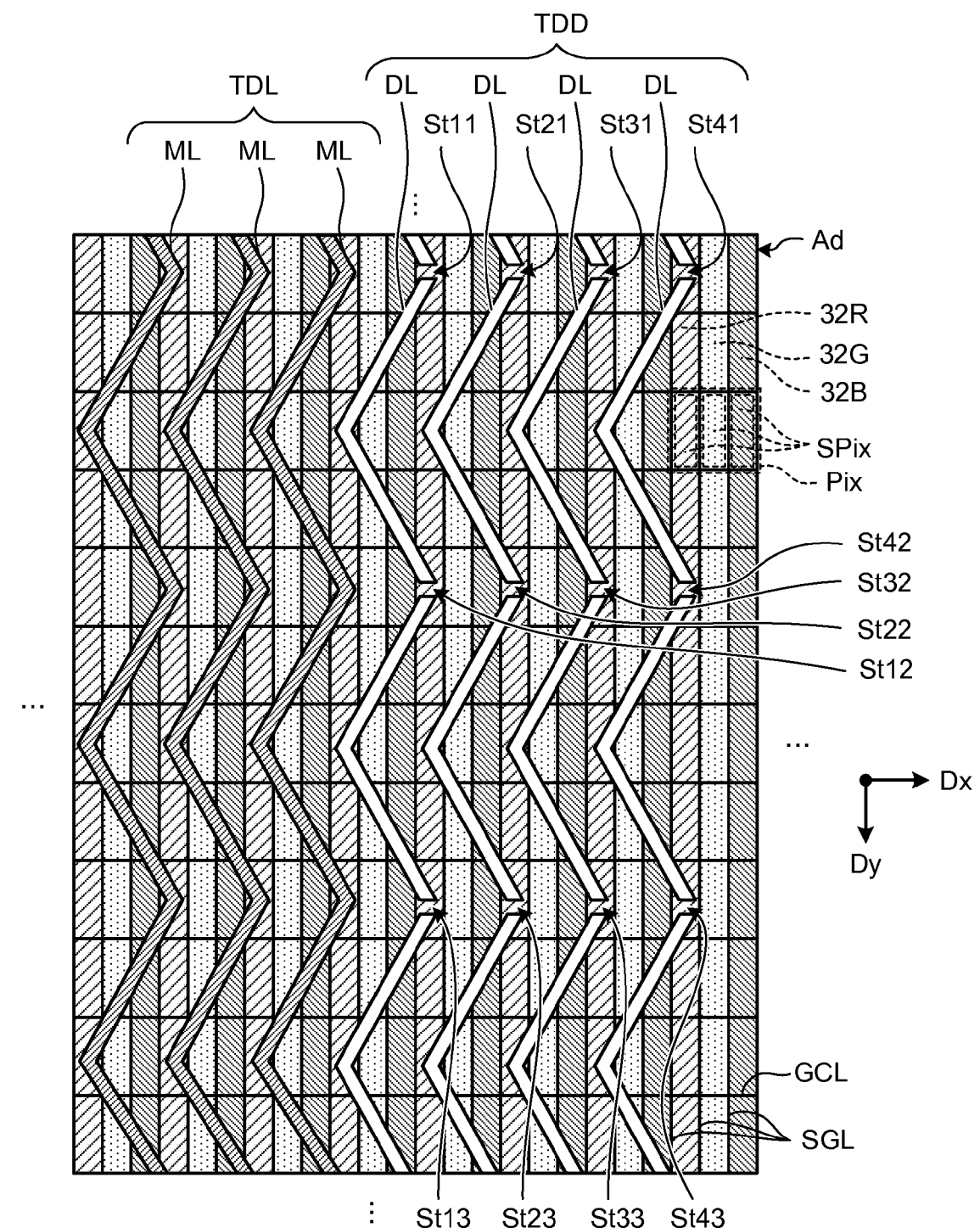
FIG. 16 is a view for explaining the positional relation between slits of the dummy electrode and the color areas of the display area according to a comparative example.

FIG. 16 is a view for explaining the positional relation between slits of the dummy electrode and the color areas of the display area according to a comparative example. As illustrated in FIG. 16, the conductive thin wire DL of the dummy electrode TDD according to the comparative example includes a plurality of thin wire pieces extending in directions different from the pixel array direction Dy. The conductive thin wires DL are divided by slits St11, St12, St13, St21, St22, St23, St31, St32, St33, St41, St42, and St43 so as to have the area smaller than that of the conductive thin wire ML. The slits St11, St12, and St13 overlap with the color area 32R. The slits St21, St22, and St23 closest to the slits St11, St12, and St13 in the pixel orthogonal direction Dx overlap with the color area 32R. The color of the color area with which the slits St11, St12, and St13 overlap is the same as that of the color area with which the slits St21, St22, and St23 overlap. The slits St31, St32, and St33 closest to the slits St21, St22, and St23 in the pixel orthogonal direction Dx overlap with the color area 32R. The color of the color area with which the slits St21, St22, and St23 overlap is the same as that of the color area with which the slits St31, St32, and St33 overlap. The slits St41, St42, and St43 closest to the slits St31, St32, and St33 in the pixel orthogonal direction Dx overlap with the color area 32R. The color of the color area with which the slits St31, St32, and St33 overlap is the same as that of the color area with which the slits St41, St42, and St43 overlap.

1-1C. Advantages

As described above, the pixels Pix are arranged in a matrix along a direction parallel to the scanning line GCL and a direction parallel to the signal line SGL. If the scanning line GCL and the signal line SGL are covered with a black matrix, the black matrix suppresses transmission of light. If the scanning line GCL and the signal line SGL are not covered with the black matrix, the scanning line GCL and the signal line SGL suppress transmission of light. In the first embodiment, a periodic pattern of a plurality of lines parallel to the pixel orthogonal direction Dx extending along a direction parallel to the scanning line GCL is likely to appear on the display area Ad. A periodic pattern of a plurality of lines parallel to the pixel array direction Dy extending along a direction parallel to the signal line SGL is also likely to appear on the display area Ad. If the touch detection electrode TDL is laminated in a direction perpendicular to the surface of the display area Ad, the pattern of the color filter layer and the scanning line or the signal line on the display area interferes with the pattern of the touch detection electrode TDL. This may possibly form a light and dark pattern, thereby causing moire or streaks to be visually recognized.

In the display device 1 with a touch detecting function according to the first embodiment, the conductive thin wire ML includes the thin wire piece satisfying a first condition. The first condition is that the width of the thin wire piece falls within a range of 1 μm to 10 μm, or the width of the thin wire piece is one-fortieth of the short side of the pixel Pix to one-tenth of the short side of the pixel Pix, as described above. This can make the period of the light and dark pattern short enough not to be visually recognized by a person. The thin wire pieces Ua, Ub, Uc, and Ud according to the first embodiment, for example, extend at the angles with respect to the pixel orthogonal direction Dx and the pixel array direction Dy. If the thin wire pieces Ua, Ub, Uc, and Ud satisfy the first condition, the angles are made larger than a certain angle. This is likely to shorten the period of the light and dark pattern. As a result, the display device 1 with a touch detecting function according to the first embodiment can reduce the possibility that moire caused by the conductive thin wire ML and the conductive thin wire DL is visually recognized.

If the color areas with which the slits St11, St12, St13, St21, St22, St23, St31, St32, St33, St41, St42, and St43 overlap are limited to the specific color area 32R as illustrated in FIG. 16, a larger amount of light tends to be output from the specific color area 32R than the amount of light output from the other color areas 32G and 32B in the display area Ad provided with the dummy electrode TDD. The display area Ad provided with the touch detection electrode TDL has a smaller amount of light output from the specific color area 32R than the display area Ad provided with the dummy electrode TDD does. The light passing through the slits St11, St12, St13, St21, St22, St23, St31, St32, St33, St41, St42, and St43 may possibly change the tone of the display area Ad provided with the dummy electrode TDD. As a result, the slits St11, St12, St13, St21, St22, St23, St31, St32, St33, St41, St42, and St43 are made conspicuous to be recognized as lines (streaks), for example. This may possibly cause the dummy electrode TDD to be visually recognized.

As illustrated in FIG. 15, the color areas with which the slits St11, St12, St13, St21, St22, St23, St31, St32, and St33 overlap are not limited to the specific color area 32R. The color areas with which the slits St11, St12, St13, St21, St22, St23, St31, St32, and St33 overlap are the color area 32R, the color area 32G, and the color area 32B. As a result, nearly the same amount of light is output from the color area 32R as the amount of light output from the other color areas 32G and 32B through any of the slits St11, St12, St13, St21, St22, St23, St31, St32, and St33 in the display area Ad provided with the dummy electrode TDD. This reduces the possibility that the light passing through the slits St11, St12, St13, St21, St22, St23, St31, St32, and St33 changes the tone of the display area Ad provided with the dummy electrode TDD. As a result, the display device 1 with a touch detecting function according to the first embodiment can make the slits St11, St12, St13, St21, St22, St23, St31, St32, and St33 inconspicuous. This can reduce the possibility that the slits of the dummy electrode TDD are visually recognized.

In the display device 1 with a touch detecting function according to the first embodiment, the slits St31, St32, and St33 closest to the slits St21, St22, and St23 in the pixel orthogonal direction Dx may overlap with the color area 32R. This is because the color of the color area with which the slits St21, St22, and St23 overlap can be set to a color different from that of the color area with which the slits St31, St32, and St33 overlap.

If the touch detection electrode TDL and the drive electrode COML are formed in a single layer and made of a metal material unlike the display device 1 with a touch detecting function according to the first embodiment, electric corrosion may possibly occur. In the display device 1 with a touch detecting function according to the first embodiment, the touch detection electrode TDL and the drive electrode COML are positioned on the respective different planes with the glass substrate 31 interposed therebetween in a direction perpendicular to the surface of the glass substrate 31. This enables the display device 1 with a touch detecting function according to the first embodiment to suppress electric corrosion. The drive electrode COML is preferably made of a translucent material. This can reduce the possibility that moire caused by interference between the touch detection electrode TDL and the drive electrode COML is visually recognized.

The drive electrode COML is arranged on the TFT substrate 21 facing the surface of the glass substrate 31 in the perpendicular direction. If the surface of the glass substrate 31 is away from the drive electrode COML in the direction perpendicular to the surface of the glass substrate 31, difference between the period of the pattern appearing on the display area Ad and the period of arrangement of the drive electrode COML varies depending on the angle at which a person views the device. Arrangement of the drive electrode COML on the TFT substrate 21 can reduce the change in the difference between the period of the pattern appearing on the display area Ad and the period of arrangement of the drive electrode COML depending on the angle at which a person views the device. The drive electrode COML according to the first embodiment is arranged in a manner extending in the pixel array direction Dy or the pixel orthogonal direction Dx. As a result, the drive electrode COML extends in a direction parallel to the scanning line GCL or a direction parallel to the signal line SGL. This can reduce the possibility that the aperture ratio decreases.

1-2. Second Embodiment

Figure 17:
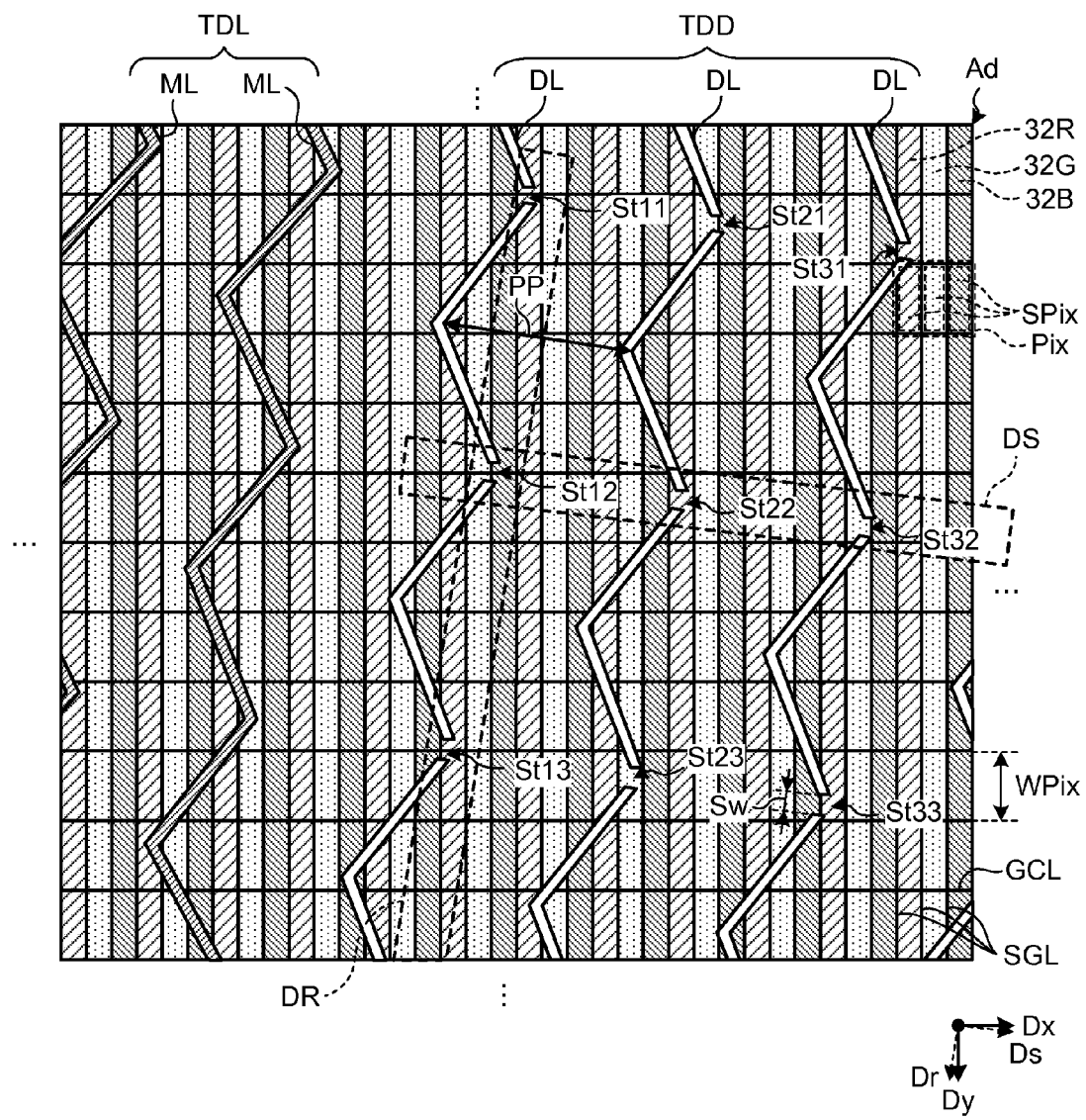
FIG. 17 is a schematic of arrangement of a touch detection electrode and a dummy electrode according to a second embodiment.

The following describes a display device 1 with a touch detecting function according to a second embodiment. FIG. 17 is a schematic of arrangement of a touch detection electrode and a dummy electrode according to the second embodiment. Components similar to those of the first embodiment are denoted by the same reference numerals, and an explanation thereof will be omitted.

A dummy electrode TDD includes a plurality of conductive thin wires DL arranged at intervals of an arrangement pitch PP. Conductive thin wires ML and the conductive thin wires DL are arranged in a manner extending in an extending direction Dr (a first direction) inclined at a predetermined angle with respect to the pixel array direction Dy. Slits St11, St13, St22, St31, and St33 overlap with the color area 32R. Slits St21, St23, and St32 overlap with the color area 32G. A slit St12 overlaps with the color area 32B.

The slits St closest to one another in the pixel orthogonal direction Dx, that is, the slits St12, St22, and St32 belonging to an area DS, for example, overlap with respective color areas of different colors. The color areas with which the slits St12, St22, and St32 overlap can be selected by adjusting inclination of a direction Ds (a second direction) in which the slits St12, St22, and St32 belonging to the area DS are arranged with respect to the pixel orthogonal direction Dx, and by adjusting the arrangement pitch PP. The slits St closest to one another in the pixel array direction Dy or the direction Ds, that is, the slits St11, St12, and St13 belonging to an area DR, for example, overlap with the color area 32R and the color area 32B alternately. The color of the color area 32R is different from that of the color area 32B as described above. The color areas with which the slits St11, St12, and St13 overlap can be selected by adjusting inclination of a direction Dr in which the slits St11, St12, and St13 belonging to the area DR are arranged with respect to the pixel array direction Dy, and by adjusting the arrangement pitch PP.

In the display device 1 with a touch detecting function according to the second embodiment, the color of the color area 32R in the display area Ad with which the slit St11 overlaps is different from that of the color area 32B in the display area Ad with which the slit St12, arranged closest to the slit St11 in the pixel array direction Dy or the direction Ds, overlaps. Thus, the color areas with which the slits St11, St12, St13, St21, St22, St23, St31, St32, and St33 overlap are not limited to the color area 32R. The color areas with which the slits St11, St12, St13, St21, St22, St23, St31, St32, and St33 overlap are the color area 32R, the color area 32G, and the color area 32B. As a result, nearly the same amount of light is output from the color area 32R as the amount of light output from the other color areas 32G and 32B through any of the slits St11, St12, St13, St21, St22, St23, St31, St32, and St33 in the display area Ad provided with the dummy electrode TDD. This reduces the possibility that the light passing through the slits St11, St12, St13, St21, St22, St23, St31, St32, and St33 changes the tone of the display area Ad provided with the dummy electrode TDD. As a result, the display device 1 with a touch detecting function according to the second embodiment can make the slits St11, St12, St13, St21, St22, St23, St31, St32, and St33 inconspicuous. This can reduce the possibility that the slits of the dummy electrode TDD are visually recognized.

1-3. Third Embodiment

Figure 18:
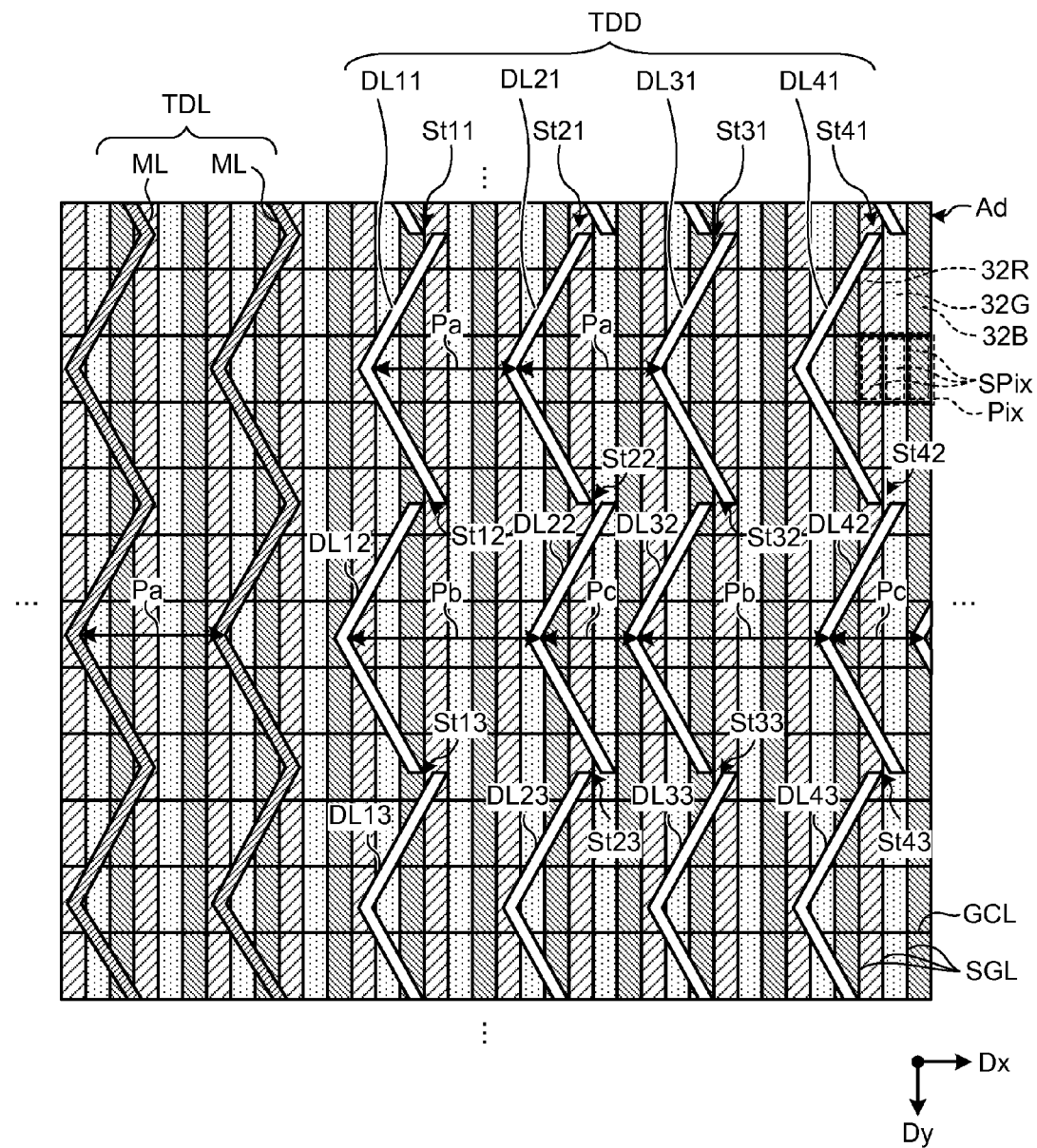
FIG. 18 is a schematic of arrangement of a touch detection electrode and a dummy electrode according to a third embodiment.

The following describes a display device 1 with a touch detecting function according to a third embodiment. FIG. 18 is a schematic of arrangement of a touch detection electrode and a dummy electrode according to the third embodiment. Components similar to those of the first and the second embodiments are denoted by the same reference numerals, and an explanation thereof will be omitted.

As illustrated in FIG. 18, a touch detection electrode TDL according to the third embodiment includes a plurality of conductive thin wires ML arranged in a manner extending in the pixel array direction Dy at intervals of an arrangement pitch Pa.

As illustrated in FIG. 18, the dummy electrode TDD according to the third embodiment includes a conductive thin wire DL11, a conductive thin wire DL12, a conductive thin wire DL13, a conductive thin wire DL21, a conductive thin wire DL22, and a conductive thin wire DL23 arranged on a plane parallel to a counter substrate 3. Because a conductive thin wire DL31, a conductive thin wire DL32, and a conductive thin wire DL33 have a pattern obtained by repeating the same pattern as that of the conductive thin wire DL11, the conductive thin wire DL12, and the conductive thin wire DL13, the explanation thereof will be omitted. Because a conductive thin wire DL41, a conductive thin wire DL42, and a conductive thin wire DL43 have a pattern obtained by repeating the same pattern as that of the conductive thin wire DL21, the conductive thin wire DL22, and the conductive thin wire DL23, the explanation thereof will be omitted.

The conductive thin wire DL11, the conductive thin wire DL12, and the conductive thin wire DL13 serve as a group to form a dummy electrode TDD aligning in the pixel array direction Dy. The conductive thin wire DL21, the conductive thin wire DL22, and the conductive thin wire DL23 also serve as a group to form a dummy electrode TDD aligning in the pixel array direction Dy.

The conductive thin wire DL11 and the conductive thin wire DL21 adjacent to each other are arranged at an interval of the arrangement pitch Pa. Similarly, the conductive thin wire DL13 and the conductive thin wire DL23 adjacent to each other are arranged at an interval of the arrangement pitch Pa.

The conductive thin wire DL12 and the conductive thin wire DL22 adjacent to each other are arranged at an interval of an arrangement pitch Pb. The length of the arrangement pitch Pb is larger than that of the arrangement pitch Pa. The conductive thin wire DL22 and the conductive thin wire DL32 adjacent to each other are arranged at an interval of an arrangement pitch Pc. The length of the arrangement pitch Pc is smaller than that of the arrangement pitch Pa. The sum of the length of the arrangement pitch Pb and the length of the arrangement pitch Pc is equal to twice the length of the arrangement pitch Pa. The difference between the length of the arrangement pitch Pb and the length of the arrangement pitch Pc is preferably equal to a natural number of times as large as the width of the sub-pixel SPix in the pixel orthogonal direction Dx.

In the display device 1 with a touch detecting function according to the third embodiment having the configuration described above, the conductive thin wire DL11, the conductive thin wire DL12, the conductive thin wire DL13, the conductive thin wire DL21, the conductive thin wire DL22, and the conductive thin wire DL23 are discontinuously arranged. Thus, slits St11, St12, St13, St21, St22, and St23 are formed. Similarly, the conductive thin wire DL31, the conductive thin wire DL32, the conductive thin wire DL33, the conductive thin wire DL41, the conductive thin wire DL42, and the conductive thin wire DL43 are discontinuously arranged. Thus, slits St31, St32, St33, St41, St42, and St43 are formed. The slit St11, for example, overlaps with the color area 32B and the color area 32R. The slit St21 closest to the slit St11 in the pixel orthogonal direction Dx overlaps with the color area 32R and the color area 32G. The color passing through the entire of the color area 32B and the color area 32R is different from the color passing through the entire of the color area 32R and the color area 32G. This reduces the possibility that light passing through the slits St11, St12, St13, St21, St22, St23, St31, St32, St33, St41, St42, and St43 changes the tone of the display area Ad provided with the dummy electrode TDD. As a result, the display device 1 with a touch detecting function according to the third embodiment can make the slits St11, St12, St13, St21, St22, St23, St31, St32, St33, St41, St42, and St43 inconspicuous. This can reduce the possibility that the slits of the dummy electrode TDD are visually recognized.

Modification of the Third Embodiment

Figure 19:
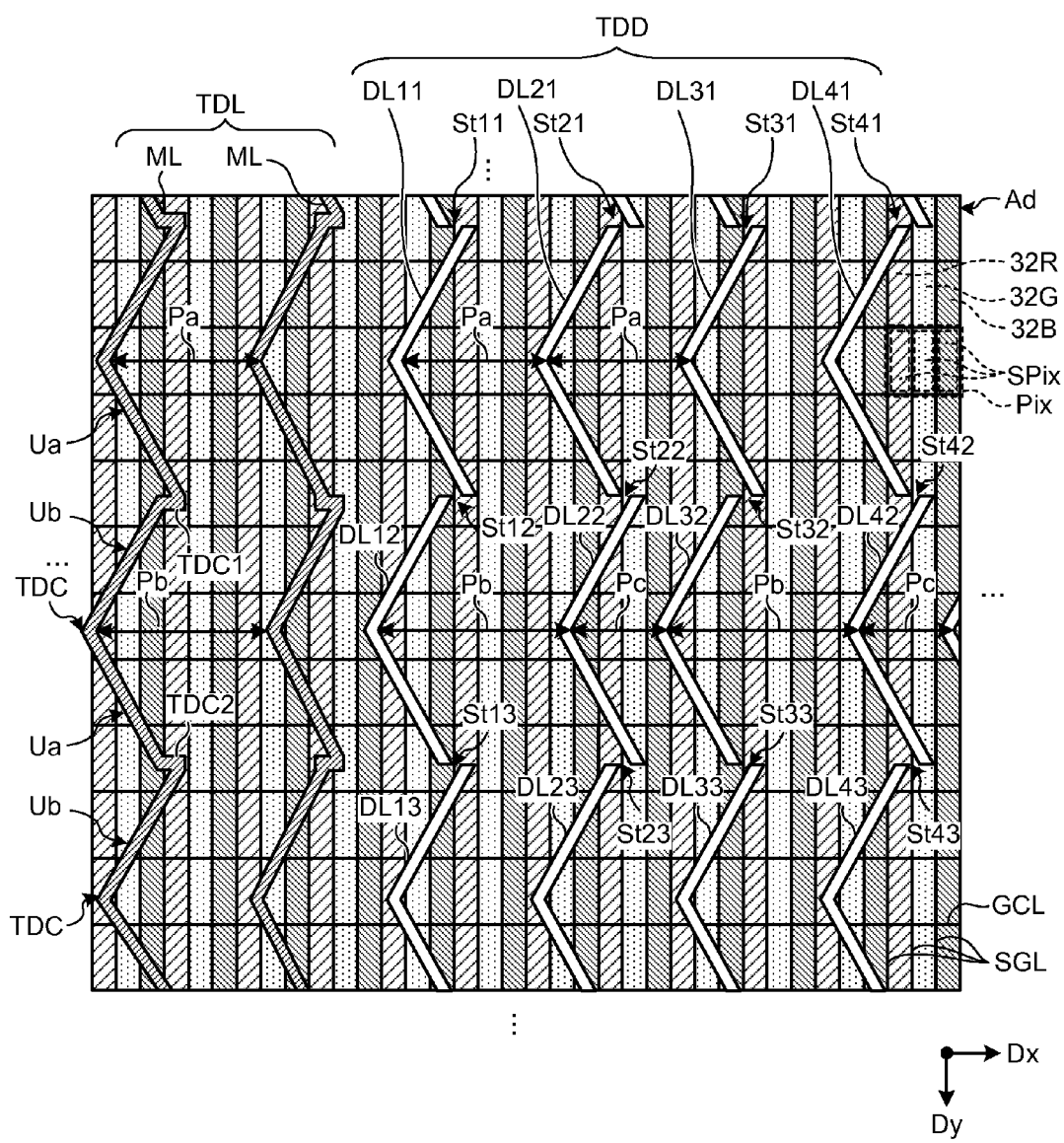
FIG. 19 is a schematic of arrangement of the touch detection electrode and the dummy electrode according to a modification of the third embodiment.

FIG. 19 is a schematic of arrangement of the touch detection electrode and the dummy electrode according to a modification of the third embodiment. The touch detection electrode TDL may be arranged such that the arrangement pitch between conductive thin wires ML adjacent to each other is adjusted to any one of the arrangement pitches Pa, Pb, and Pc of the dummy electrode TDD placed at the same position in the pixel orthogonal direction Dx. As illustrated in FIG. 19, for example, the arrangement pitch between conductive thin wires ML adjacent to each other in the touch detection electrode TDL partially includes the arrangement pitch Pa and the arrangement pitch Pb. The change in the arrangement pitch between the conductive thin wires forms a gap between the thin wire piece Ua and the thin wire piece Ub. The gap between the thin wire piece Ua and the thin wire piece Ub is bridged with conductive parts TDC1 and TDC2 made of the same material as that of the thin wire piece Ua and the thin wire piece Ub. This configuration makes the electrode pattern of the dummy electrode TDD closer to the pattern of the touch detection electrode TDL. This can reduce the possibility that the dummy electrode TDD and the touch detection electrode TDL are visually recognized.

1-4. Fourth Embodiment

Figure 20:
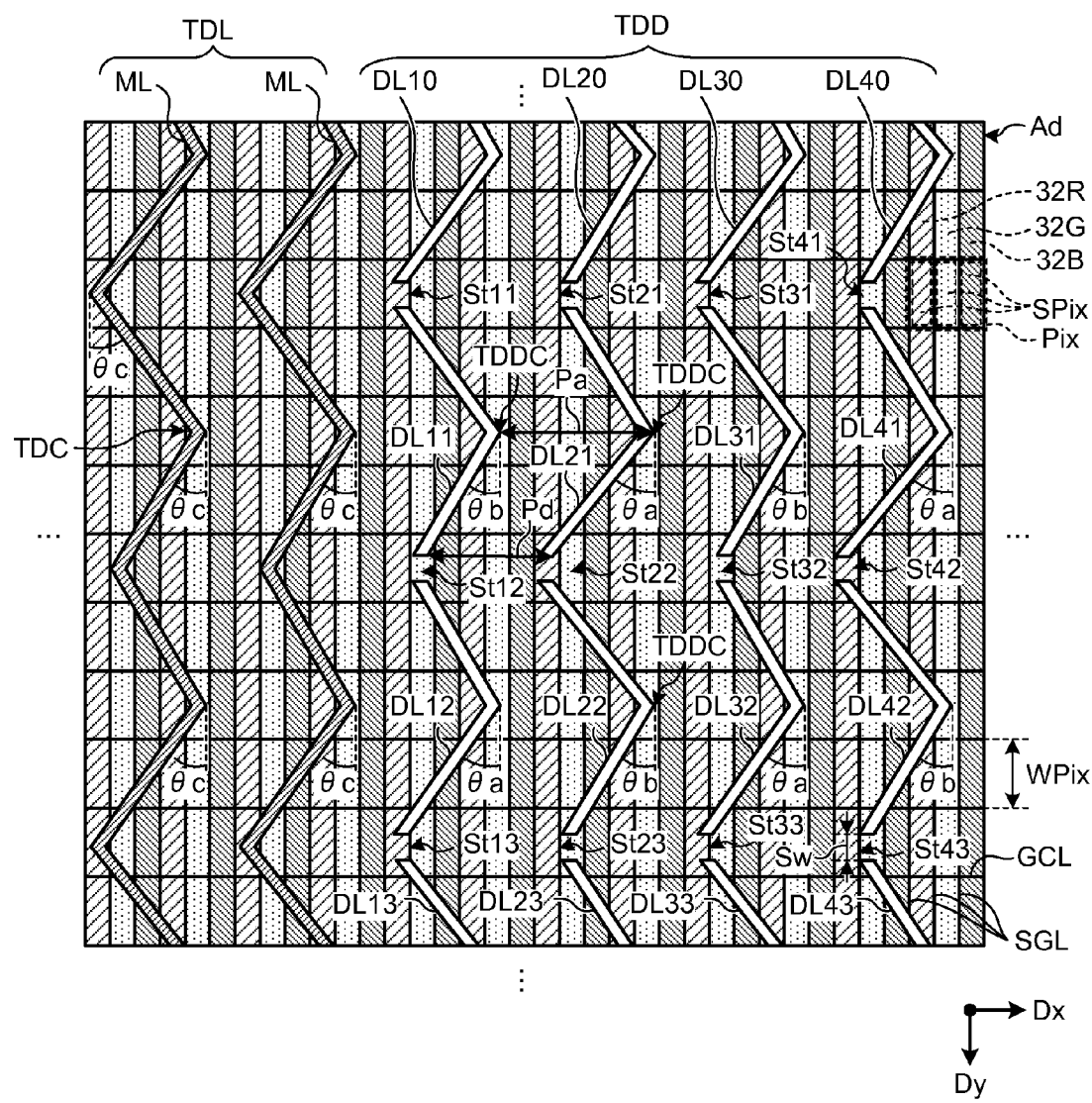
FIG. 20 is a schematic of arrangement of a touch detection electrode and a dummy electrode according to a fourth embodiment.

The following describes a display device 1 with a touch detecting function according to a fourth embodiment. FIG. 20 is a schematic of arrangement of a touch detection electrode and a dummy electrode according to the fourth embodiment. Components similar to those of the first, the second, and the third embodiments are denoted by the same reference numerals, and an explanation thereof will be omitted.

As illustrated in FIG. 20, a touch detection electrode TDL according to the fourth embodiment includes a plurality of conductive thin wires ML arranged in a manner extending in the pixel array direction Dy. As described above, the conductive thin wires ML are bent at an angle with respect to the pixel array direction Dy, that is, at a predetermined angle Oc at each bent portion TDC.

As illustrated in FIG. 20, the touch detection electrode TDL according to the fourth embodiment includes a conductive thin wire DL10, a conductive thin wire DL11, a conductive thin wire DL12, a conductive thin wire DL13, a conductive thin wire DL20, a conductive thin wire DL21, a conductive thin wire DL22, and a conductive thin wire DL23 arranged on a plane parallel to a counter substrate 3. Because a conductive thin wire DL30, a conductive thin wire DL31, a conductive thin wire DL32, and a conductive thin wire DL33 have a pattern obtained by repeating the same pattern as that of the conductive thin wire DL10, the conductive thin wire DL11, the conductive thin wire DL12, and the conductive thin wire DL13, the explanation thereof will be omitted. Because a conductive thin wire DL40, a conductive thin wire DL41, a conductive thin wire DL42, and a conductive thin wire DL43 have a pattern obtained by repeating the same pattern as that of the conductive thin wire DL20, the conductive thin wire DL21, the conductive thin wire DL22, and the conductive thin wire DL23, the explanation thereof will be omitted.

The conductive thin wire DL10, the conductive thin wire DL11, the conductive thin wire DL12, and the conductive thin wire DL13 serve as a group to form a dummy electrode TDD aligning in the pixel array direction Dy. The conductive thin wire DL20, the conductive thin wire DL21, the conductive thin wire DL22, and the conductive thin wire DL23 also serve as a group to form a dummy electrode TDD aligning in the pixel array direction Dy. A length Sw of a slit St illustrated in FIG. 20 is smaller than the length WPix of the sub-pixel SPix in the pixel array direction Dy. This configuration reduces the possibility that the slit St overlaps across a plurality of sub-pixels SPix.

The conductive thin wire DL11 and the conductive thin wire DL21 adjacent to each other are arranged at an interval of a constant arrangement pitch Pa at a bent portion TDDC in the pixel orthogonal direction Dx. Similarly, the conductive thin wire DL12 and the conductive thin wire DL22 adjacent to each other are arranged at an interval of the constant arrangement pitch Pa at the bent portion TDDC in the pixel orthogonal direction Dx. The conductive thin wire DL11 and the conductive thin wire DL22 are bent at an angle with respect to the pixel array direction Dy, that is, at a predetermined angle Ob at the bent portion TDDC. The conductive thin wire DL12 and the conductive thin wire DL21 are bent at an angle with respect to the pixel array direction Dy, that is, at a predetermined angle Oa at the bent portion TDDC. The predetermined angle Oa is different from the predetermined angle Ob. This configuration makes the length of an arrangement pitch Pd between the slit St12 and the slit St22 different from that of the arrangement pitch Pa. As a result, the slit St12 overlaps with the color area 32G, whereas the slit St22 overlaps with the color area 32R. The color of the color area with which the slit St22 closest to the slit St12 in the pixel orthogonal direction Dx overlaps is different from that of the color area with which the slit St12 overlaps.

The slit St12 overlaps with the color area 32G, whereas the slit St13 overlaps with the color area 32R. The color of the color area with which the slit St13 closest to the slit St12 in the pixel array direction Dy overlaps is different from that of the color area with which the slit St12 overlaps.

This reduces the possibility that light passing through the slits St11, St12, St13, St21, St22, St23, St31, St32, St33, St41, St42, and St43 changes the tone of the display area Ad provided with the dummy electrode TDD. As a result, the display device 1 with a touch detecting function according to the fourth embodiment can make the slits St11, St12, St13, St21, St22, St23, St31, St32, St33, St41, St42, and St43 inconspicuous. This can reduce the possibility that the slits of the dummy electrode TDD are visually recognized.

Modification of the Fourth Embodiment

Figure 21:
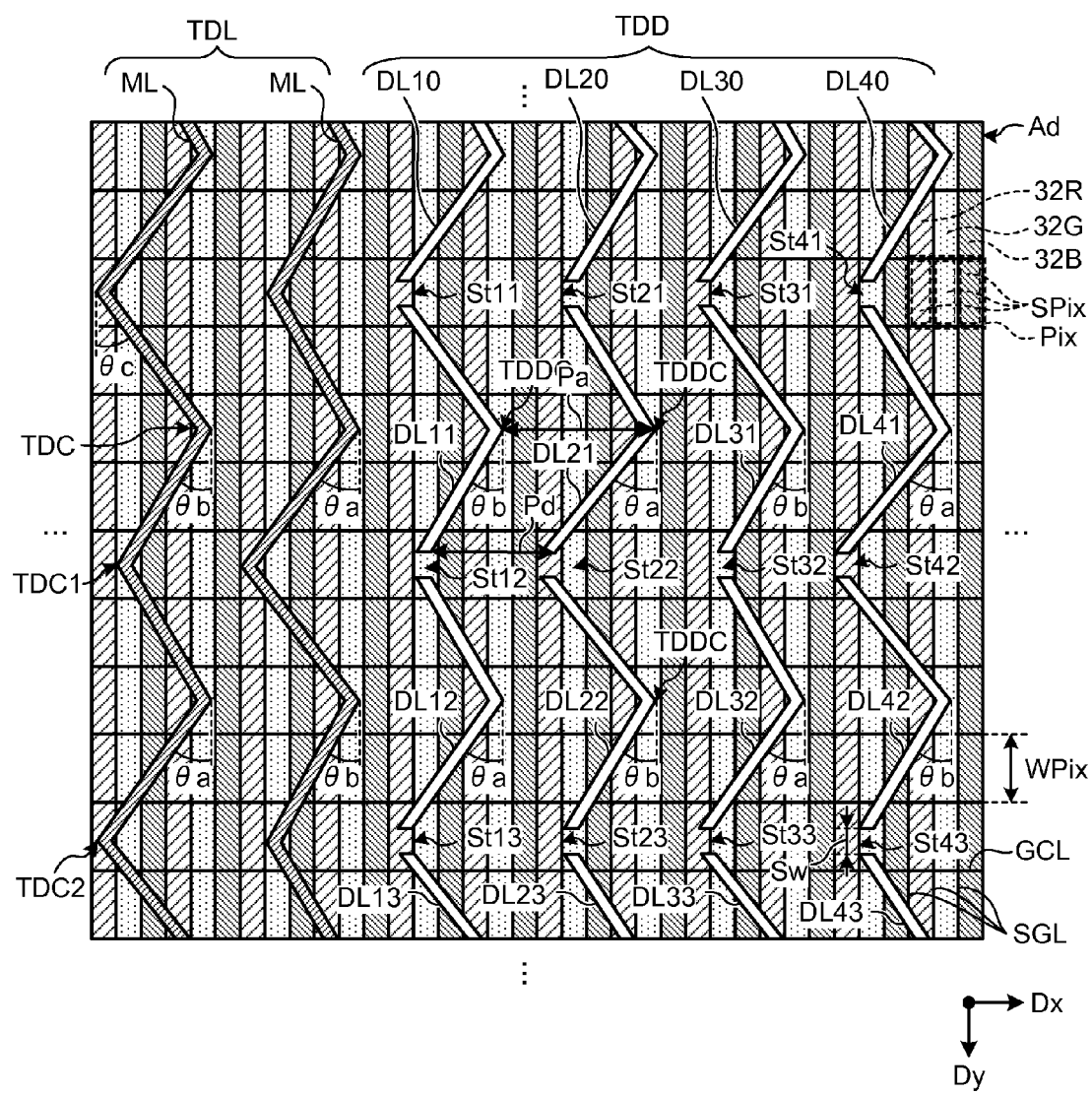
FIG. 21 is a schematic of arrangement of the touch detection electrode and the dummy electrode according to a modification of the fourth embodiment.

FIG. 21 is a schematic of arrangement of the touch detection electrode and the dummy electrode according to a modification of the fourth embodiment. The conductive thin wire ML is bent at an angle with respect to the pixel array direction Dy, that is, at predetermined angles θc, θb, θc, and θa at the bent portion TDC, a bent portion TDC1, the bent portion TDC, and a bent portion TDC2, respectively. As described above, the conductive thin wire DL11 and the conductive thin wire DL22 are bent at an angle with respect to the pixel array direction Dy, that is, at the predetermined angle θb at the bent portion TDDC. The conductive thin wire DL12 and the conductive thin wire DL21 are bent at an angle with respect to the pixel array direction Dy, that is, at the predetermined angle θa at the bent portion TDDC. With this configuration, the angles formed by the conductive thin wire ML with respect to the pixel array direction Dy at the bent portions TDC are the same as the respective angles formed by the conductive thin wire DL11 and the conductive thin wire DL22 with respect to the pixel array direction Dy at the bent portions TDDC viewed in the pixel orthogonal direction Dx. This configuration makes the electrode pattern of the dummy electrode TDD closer to the pattern of the touch detection electrode TDL. This can reduce the possibility that the dummy electrode TDD and the touch detection electrode TDL are visually recognized.

1-5. Fifth Embodiment

Figure 22:
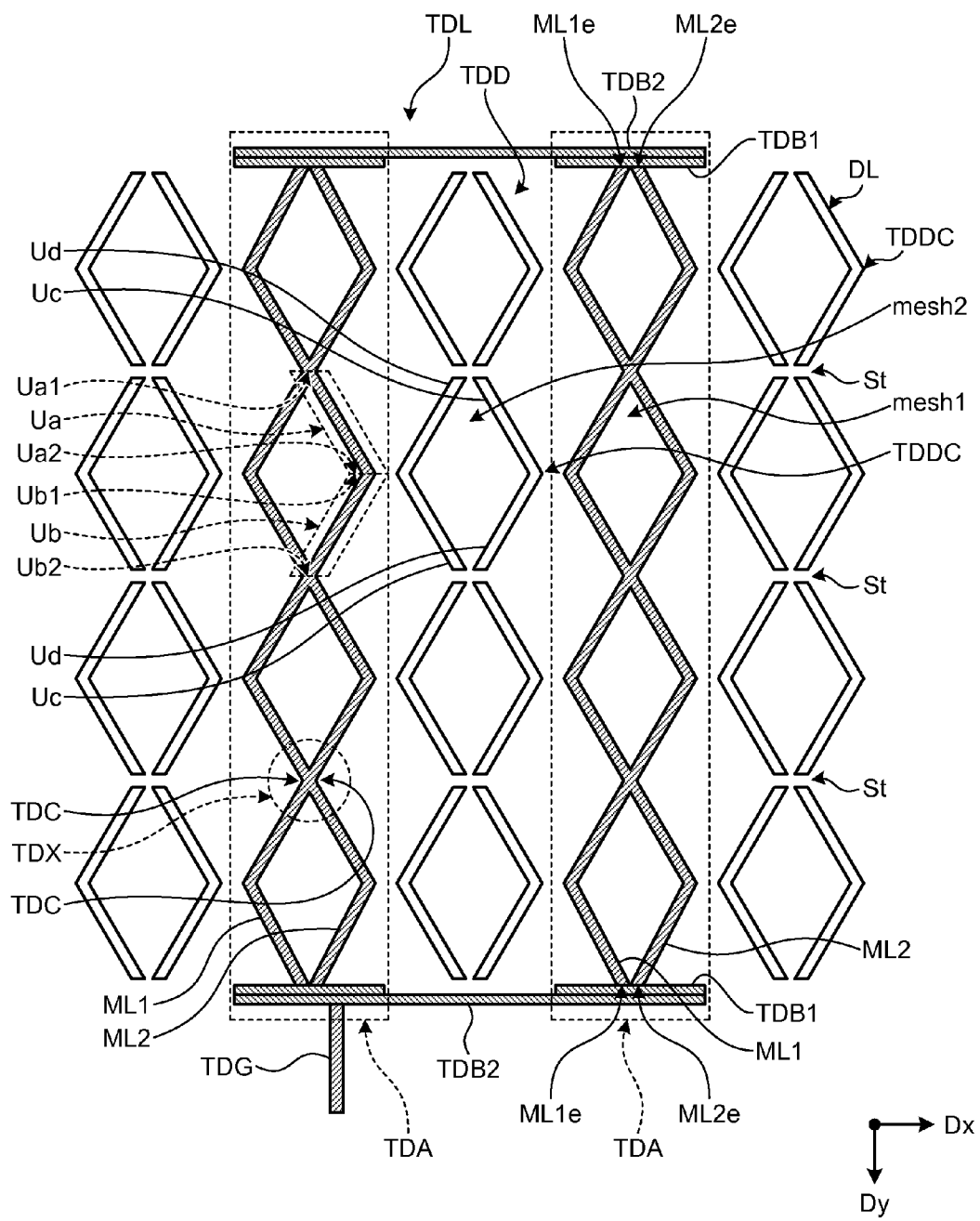
FIG. 22 is a schematic of arrangement of a touch detection electrode and a dummy electrode according to a fifth embodiment.

The following describes a display device 1 with a touch detecting function according to a fifth embodiment. FIG. 22 is a schematic of arrangement of a touch detection electrode and a dummy electrode according to the fifth embodiment. Components similar to those of the first, the second, the third, and the fourth embodiments are denoted by the same reference numerals, and an explanation thereof will be omitted.

As illustrated in FIG. 22, a touch detection electrode TDL according to the fifth embodiment includes a conductive thin wire ML1 and a conductive thin wire ML2 extending in the pixel array direction Dy on a plane parallel to a counter substrate 3. The conductive thin wire ML1 and the conductive thin wire ML2 serve as a pair to form an area TDA. An end ML1e of the conductive thin wire ML1 and an end ML2e of the conductive thin wire ML2 are coupled via a first conductive part TDB 1, thereby establishing electrical continuity therebetween.

The conductive thin wire ML1 corresponds to the conductive thin wire ML described in the first embodiment. The conductive thin wire ML2 is line-symmetrical to the conductive thin wire ML1 with respect to a line parallel to the pixel array direction Dy. The conductive thin wire ML2 is made of the same material as that of the conductive thin wire ML1. The conductive thin wire ML2 is arranged so as to form an intersection TDX to which a bent portion TDC of the conductive thin wire ML1 and a bent portion TDC of the conductive thin wire ML2 are connected. The conductive thin wire ML1 and the conductive thin wire ML2 establish electrical continuity therebetween at the intersection TDX. Thus, the conductive thin wire ML1 and the conductive thin wire ML2 form a mesh-like surrounded area mesh1 surrounded by thin wire pieces Ua and thin wire pieces Ub. The conductive thin wire ML1 and the conductive thin wire ML2 are not necessarily connected to each other at the bent portion TDC. The conductive thin wire ML1 and the conductive thin wire ML2, for example, may be connected to each other at an intermediate portion of the thin wire piece Ua of the conductive thin wire ML1 and an intermediate portion of the thin wire piece Ub of the conductive thin wire ML2, thereby establishing electrical continuity therebetween.

A dummy electrode TDD includes a thin wire piece Uc and a thin wire piece Ud. The thin wire piece Uc is arranged parallel to the thin wire piece Ua, whereas the thin wire piece Ud is arranged parallel to the thin wire piece Ub. The thin wire piece Uc and the thin wire piece Ud are arranged such that the area of a surrounded area mesh2 surrounded by two thin wire pieces Uc and two thin wire pieces Ud is the same as that of the surrounded area mesh1. This configuration reduces the difference in the light-shielding property between the area in which the touch detection electrode TDL is arranged and the area in which no touch detection electrode TDL is arranged. This can reduce the possibility that the touch detection electrode TDL is likely to be visually recognized.

Figure 23:
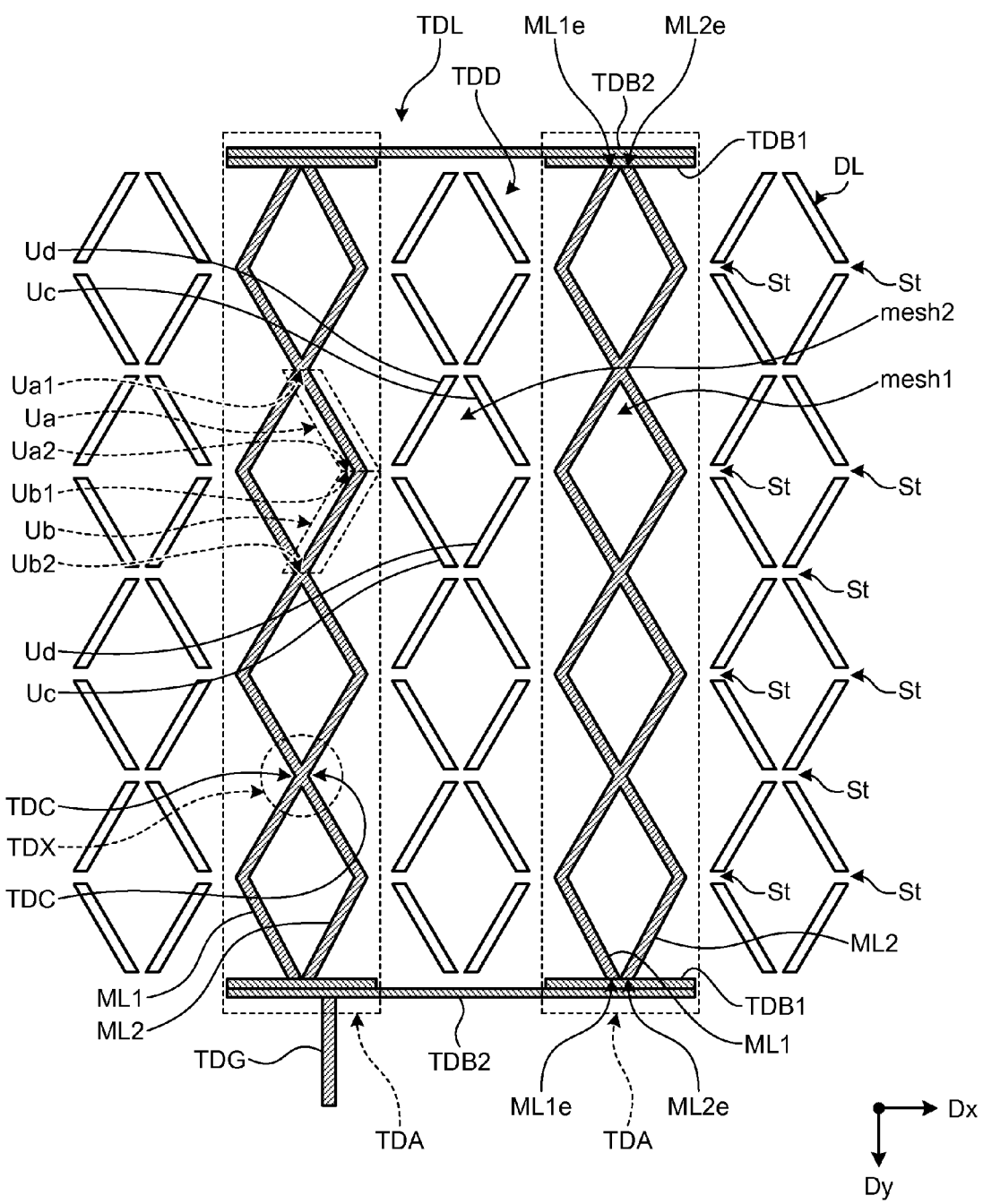
FIG. 23 is a schematic of arrangement of the touch detection electrode and the dummy electrode according to a modification of the fifth embodiment.

FIG. 23 is a schematic of arrangement of the touch detection electrode and the dummy electrode according to a modification of the fifth embodiment. The thin wire piece Uc is a pattern made of a conductive material extending at an angle with respect to the pixel array direction Dy. The thin wire piece Ud is a pattern made of a conductive material extending in a direction different from the direction in which the thin wire piece Uc extends. The thin wire piece Uc has substantially the same size as that of the thin wire piece Ua and is arranged parallel to the direction in which the thin wire piece Ua extends. The thin wire piece Ud has substantially the same size as that of the thin wire piece Ub and is arranged parallel to the direction in which the thin wire piece Ub extends. A slit St illustrated in FIG. 23 is also provided at the position of a bent portion TDDC illustrated in FIG. 22. The slit St illustrated in FIG. 23 is provided between the thin wire piece Uc and the thin wire piece Ud. The thin wire piece Uc and the thin wire piece Ud are bent at a predetermined angle at each slit St. Thus, the surrounded area mesh2 surrounded by two thin wire pieces Uc and two thin wire pieces Ud is defined.

With these configurations, even if a part of one of the conductive thin wire ML1 and the conductive thin wire ML2 is formed thin, thereby making electrical continuity unreliable, the display device 1 with a touch detecting function according to the fifth embodiment and the modification thereof can have an increased probability of touch detection because of the intersection TDX coupling the one conductive thin wire to the other conductive thin wire.

Figure 24:
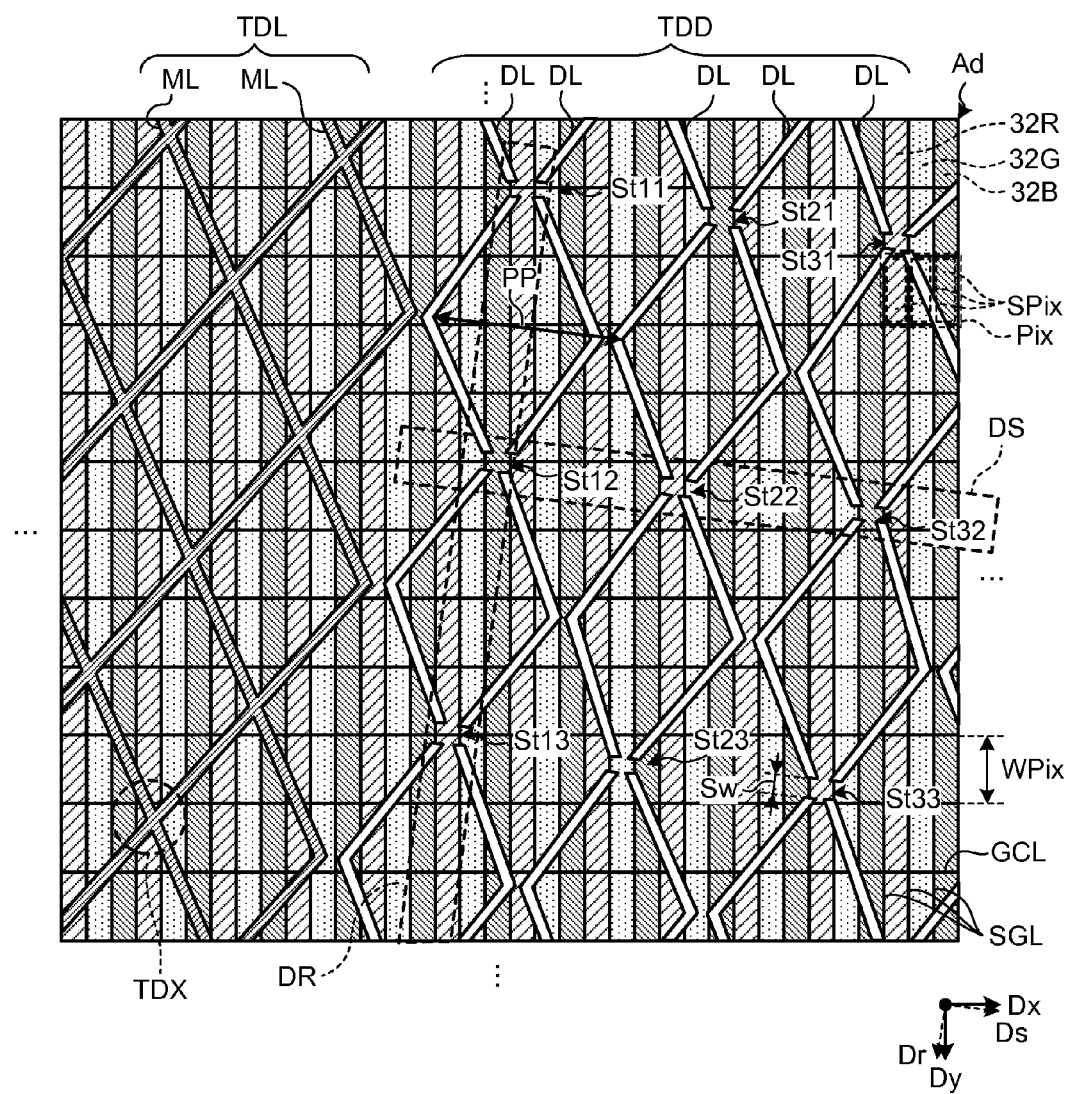
FIG. 24 is a view for explaining the positional relation between slits of the dummy electrode and color areas of a display area according to the fifth embodiment.

FIG. 24 is a view for explaining the positional relation between slits of the dummy electrode and the color areas of the display area according to the fifth embodiment. The dummy electrode TDD includes a plurality of conductive thin wires DL arranged at intervals of an arrangement pitch PP. A conductive thin wire ML and the conductive thin wire DL are arranged in a manner extending in an extending direction Dr inclined at a predetermined angle with respect to the pixel array direction Dy. Slits St11, St13, St22, St31, and St33 overlap with the color area 32R. A Slit St23 overlaps with the color area 32G. Slits St21, St12, and St32 overlap with the color area 32B.

The slits St closest to one another in the pixel orthogonal direction Dx, that is, the slits St12, St22, and St32 belonging to an area DS, for example, overlap with respective color areas of different colors. The color areas with which the slits St12, St22, and St32 overlap can be selected by adjusting inclination of a direction Ds in which the slits St12, St22, and St32 belonging to the area DS are arranged with respect to the pixel orthogonal direction Dx, and by adjusting the arrangement pitch PP. The slits St closest to one another in the pixel array direction Dy, that is, the slits St11, St12, and St13 belonging to an area DR, for example, overlap with the color area 32R and the color area 32B alternately. The color of the color area 32R is different from that of the color area 32B as described above. The color areas with which the slits St11, St12, and St13 overlap can be selected by adjusting inclination of a direction Dr in which the slits St11, St12, and St13 belonging to the area DR are arranged with respect to the pixel array direction Dy, and by adjusting the arrangement pitch PP.

In the display device 1 with a touch detecting function according to the fifth embodiment, the color of the color area 32R in the display area Ad with which the slit St11 overlaps is different from that of the color area 32B in the display area Ad with which the slit St12, arranged closest to the slit St11 in the pixel array direction Dy, overlaps. Thus, the color areas with which the slits St11, St12, St13, St21, St22, St23, St31, St32, and St33 overlap are not limited to the color area 32R. The color areas with which the slits St11, St12, St13, St21, St22, St23, St31, St32, and St33 overlap are the color area 32R, the color area 32G, and the color area 32B. As a result, nearly the same amount of light is output from the color area 32R as the amount of light output from the other color areas 32G and 32B through any of the slits St11, St12, St13, St21, St22, St23, St31, St32, and St33 in the display area Ad provided with the dummy electrode TDD. This reduces the possibility that the light passing through the slits St11, St12, St13, St21, St22, St23, St31, St32, and St33 changes the tone of the display area Ad provided with the dummy electrode TDD. As a result, the display device 1 with a touch detecting function according to the fifth embodiment can make the slits St11, St12, St13, St21, St22, St23, St31, St32, and St33 inconspicuous. This can reduce the possibility that the slits of the dummy electrode TDD are visually recognized.

In the display device 1 with a touch detecting function according to the fifth embodiment, the color areas with which the intersections TDX of the mesh-like conductive thin wires ML overlap are not limited to the color area 32R. The color areas with which the intersections TDX overlap are the color area 32R, the color area 32G, and the color area 32B. This reduces deviation of the color areas in which the intersections TDX block light. Thus, it is possible to reduce fluctuations in the tone of the display area Ad provided with the touch detection electrode TDL.

1-6. Modifications of the Embodiments

Figure 25:
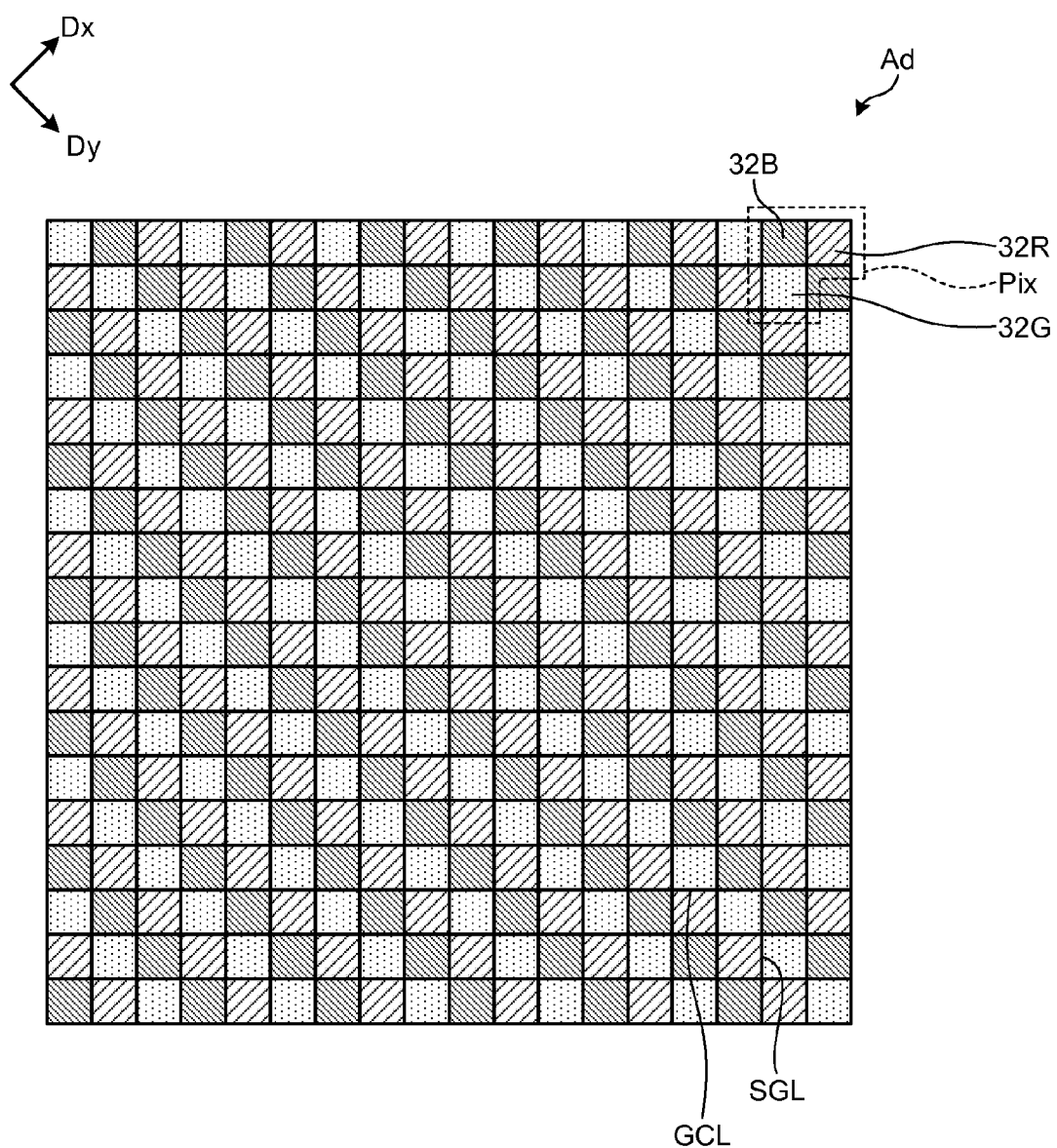
FIG. 25 is a schematic for explaining a pixel array direction according to the first, the second, the third, the fourth, and the fifth embodiments and the modifications thereof (hereinafter, referred to as the present embodiments)

The following describes modifications having a configuration applicable to the first, the second, the third, the fourth, and the fifth embodiments and the modifications thereof (hereinafter, referred to as the present embodiments). Components similar to those of the first, the second, the third, the fourth, and the fifth embodiment are denoted by the same reference numerals, and an explanation thereof will be omitted. FIG. 25 is a schematic for explaining a pixel array direction according to the present embodiments.

The color areas 32R, 32G, and 32B are associated with the respective sub-pixels SPix. The color areas 32R, 32G, and 32B serve as a group to form the pixel Pix. As illustrated in FIG. 25, the pixels Pix are arranged in a matrix in a direction parallel to the scanning line GCL and a direction parallel to the signal line SGL. The pixels Pix are arranged such that color areas of the same color are not arranged side by side in the direction parallel to the scanning line GCL or the direction parallel to the signal line SGL.

The pixel array direction Dy is a direction in which the color areas having the highest human visibility are aligned. G (green) has the highest human visibility of the three colors of R (red), G (green), and B (blue). Because the color areas 32G are aligned in the diagonal direction of the color areas 32G in FIG. 25, the pixel array direction Dy corresponds to the diagonal direction of the color areas 32G.

Figure 26:
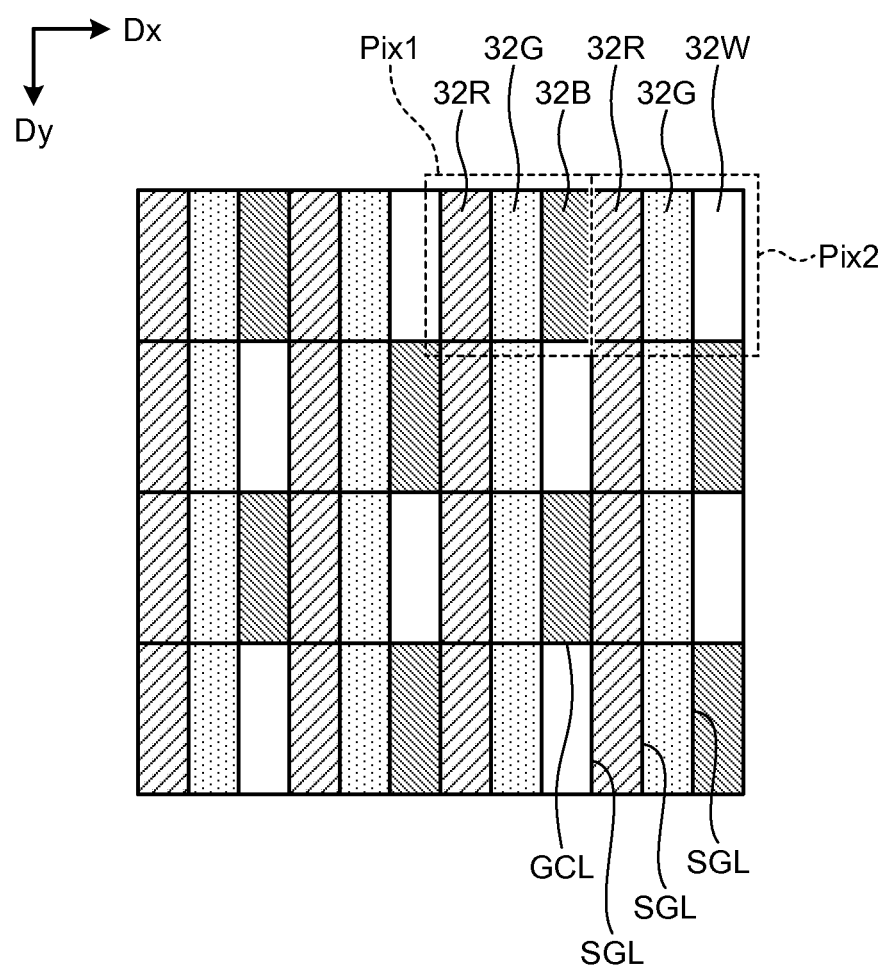
FIG. 26 is a schematic for explaining another pixel array direction according to the present embodiments.

The following describes another pixel array direction. FIG. 26 is a schematic for explaining another pixel array direction according to the present embodiments. The color areas 32R, 32G, 32B, and 32W of four colors of R (red), G (green), B (blue), and W (white) are associated with the respective sub-pixels SPix. The color areas 32R, 32G, and 32B or the color areas 32R, 32G, and 32W serve as a group to form the pixel Pix. The pixel Pix formed of the color areas 32R, 32G, and 32B is referred to as a pixel Pix1, whereas the pixel Pix formed of the color areas 32R, 32G, and 32W is referred to as a pixel Pix2. As illustrated in FIG. 26, the pixels Pix are arranged in a matrix in a direction parallel to the scanning line GCL and a direction parallel to the signal line SGL. The pixel Pix1 and the pixel Pix2 are arranged such that pixels Pix of the same type are not arranged side by side in the direction parallel to the scanning line GCL or the direction parallel to the signal line SGL.

The pixel array direction Dy is a direction in which the color areas having the highest human visibility are aligned. W (white) has the highest human visibility of the four colors of R (red), G (green), B (blue), and W (white). Because there is no section in which the color areas 32W are arranged side by side, the color areas 32W have no alignment direction. In this case, the direction in which the color areas having the second highest human visibility are aligned corresponds to the pixel array direction Dy. Except for W (white), G (green) has the highest human visibility of the three colors of R (red), G (green), and B (blue). Because the color areas 32G are aligned in the direction parallel to the signal line SGL in FIG. 26, the pixel array direction Dy corresponds to the direction parallel to the signal line SGL.

Figure 27:
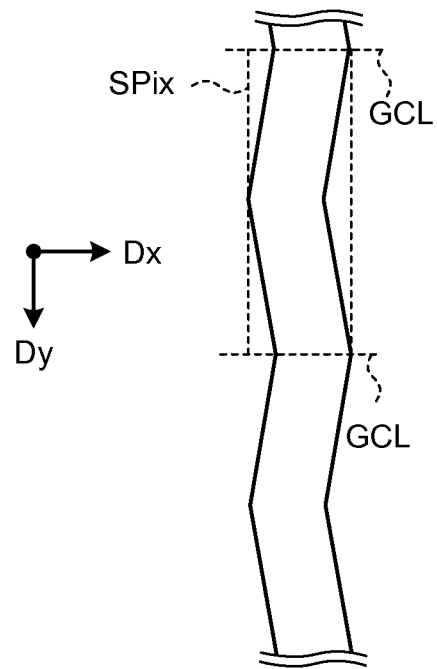
FIG. 27 is a schematic for explaining the pixel array direction according to the present embodiments.
Figure 28:
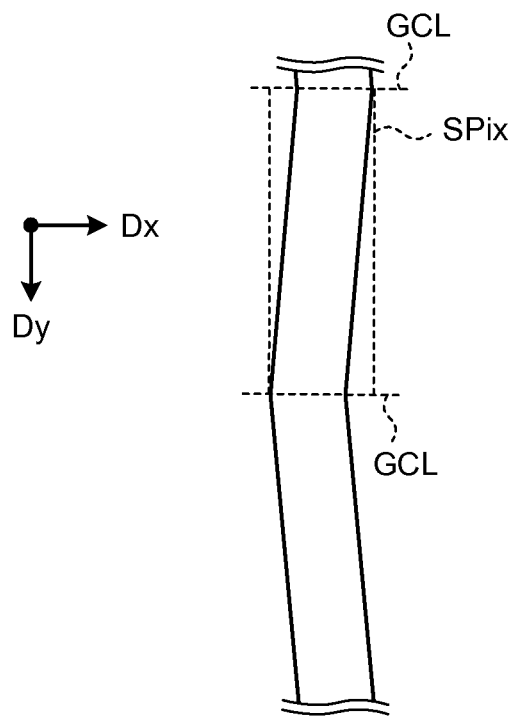
FIG. 28 is another schematic for explaining the pixel array direction according to the present embodiments.

While the pixel array direction Dy has been explained on the assumption that the sub-pixel SPix has a schematically rectangular shape, the signal line SGL may be bent. FIG. 27 is a schematic for explaining the pixel array direction according to the present embodiments. FIG. 28 is another schematic for explaining the pixel array direction according to the present embodiments. If the signal line SGL winds as illustrated in FIG. 27 and FIG. 28, the pixel array direction Dy can be determined by assuming the sub-pixel SPix to be a rectangle. Thus, the features of the present embodiments can be achieved.

Figure 29:
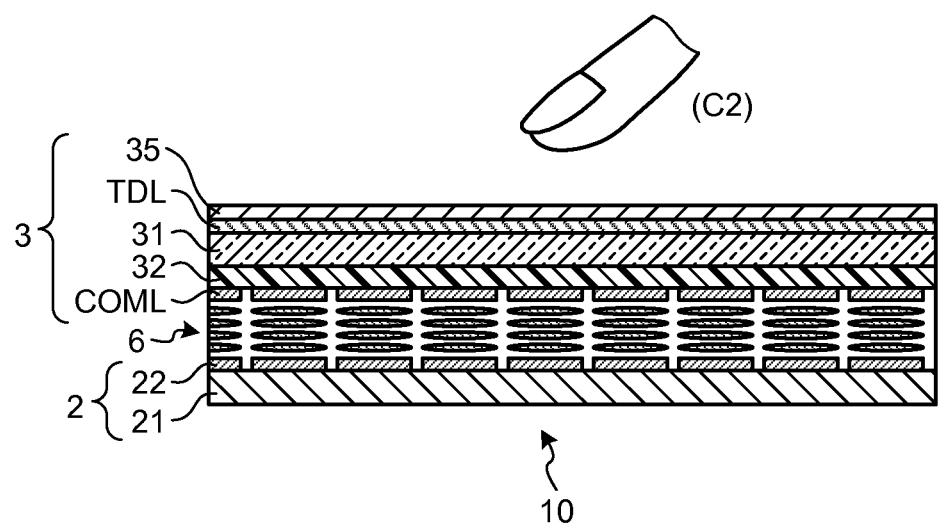
FIG. 29 is a sectional view of a schematic sectional structure of the display unit with a touch detecting function according to the present embodiments.

The following describes another example of the schematic sectional structure of the display unit with a touch detecting function according to the present embodiments. FIG. 29 is a sectional view of a schematic sectional structure of the display unit with a touch detecting function according to the present embodiments. In the display device 1 with a touch detecting function according to the present embodiments, the display unit 10 with a touch detecting function is formed by integrating the liquid-crystal display unit 20 provided with liquid crystals of various types of modes, such as the FFS mode and the IPS mode, and the touch detecting device 30. Instead of this, as illustrated in FIG. 29, a display unit 10 with a touch detecting function according to the present embodiments may be formed by integrating liquid crystals of various types of modes, such as a twisted nematic (TN) mode, a vertical alignment (VA) mode, and an electrically controlled birefringence (ECB) mode, and a touch detecting device.

2. APPLICATION EXAMPLES

The following describes application examples of the displaying device 1 with a touch detecting function explained in the embodiments and the modifications with reference to FIG. 30 to FIG. 42. FIG. 30 to FIG. 42 are schematics of examples of an electronic apparatus to which the display device with a touch detecting function or the display device according to the present embodiments is applied. The display device 1 with a touch detecting function and the display device according to the present embodiments and the modifications are applicable to electronic apparatuses of all fields, such as television apparatuses, digital cameras, notebook personal computers, portable electronic apparatuses including mobile phones, and video cameras. In other words, the display device 1 with a touch detecting function and the display device according to the present embodiments and the modifications are applicable to electronic apparatuses of all fields that display video signals received from the outside or video signals generated inside thereof as an image or video.

2-1. First Application Example

Figure 30:
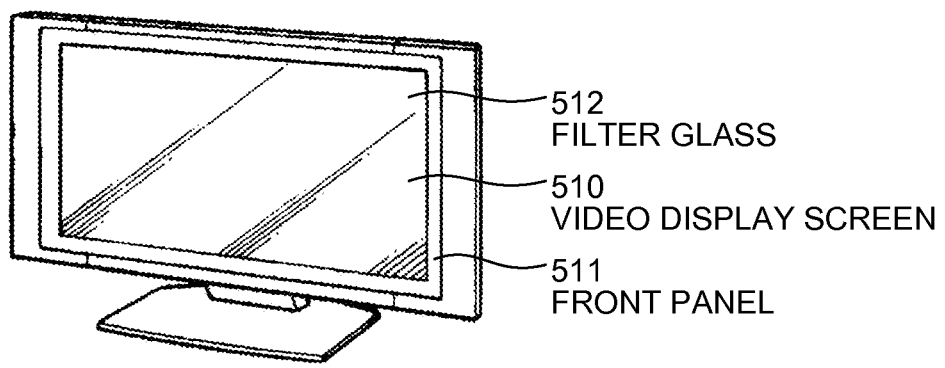
FIG. 30 is a schematic of an example of an electronic apparatus to which the display device with a touch detecting function or the display device according to the present embodiments is applied.

An electronic apparatus illustrated in FIG. 30 is a television apparatus to which the display device 1 with a touch detecting function and the display device according to the present embodiments and the modifications are applied. The television apparatus has a video display screen 510 including a front panel 511 and a filter glass 512, for example. The video display screen 510 corresponds to the display device 1 with a touch detecting function and the display device according to the present embodiments and the modifications.

2-2. Second Application Example

Figure 31:
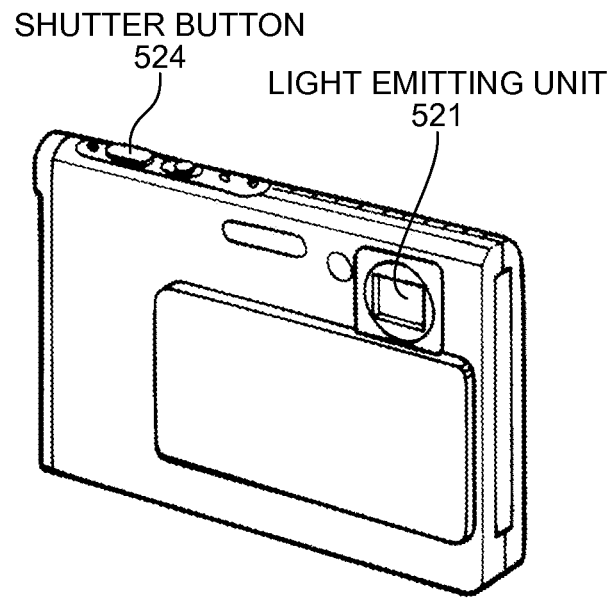
FIG. 31 is a schematic of an example of an electronic apparatus to which the display device with a touch detecting function or the display device according to the present embodiments is applied.
Figure 32:
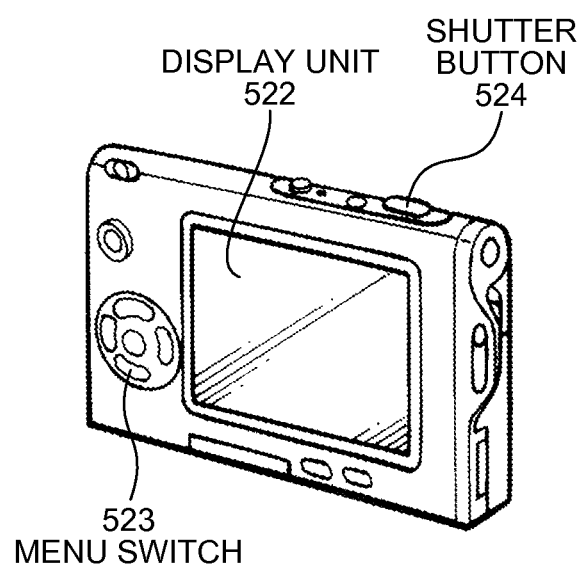
FIG. 32 is another schematic of the example of the electronic apparatus to which the display device with a touch detecting function or the display device according to the present embodiments is applied.

An electronic apparatus illustrated in FIG. 31 and FIG. 32 is a digital camera to which the display device 1 with a touch detecting function and the display device according to the present embodiments and the modifications are applied. The digital camera includes a light emitting unit 521 for flash, a display unit 522, a menu switch 523, and a shutter button 524, for example. The display unit 522 corresponds to the display device 1 with a touch detecting function and the display device according to the present embodiments and the modifications.

2-3. Third Application Example

Figure 33:
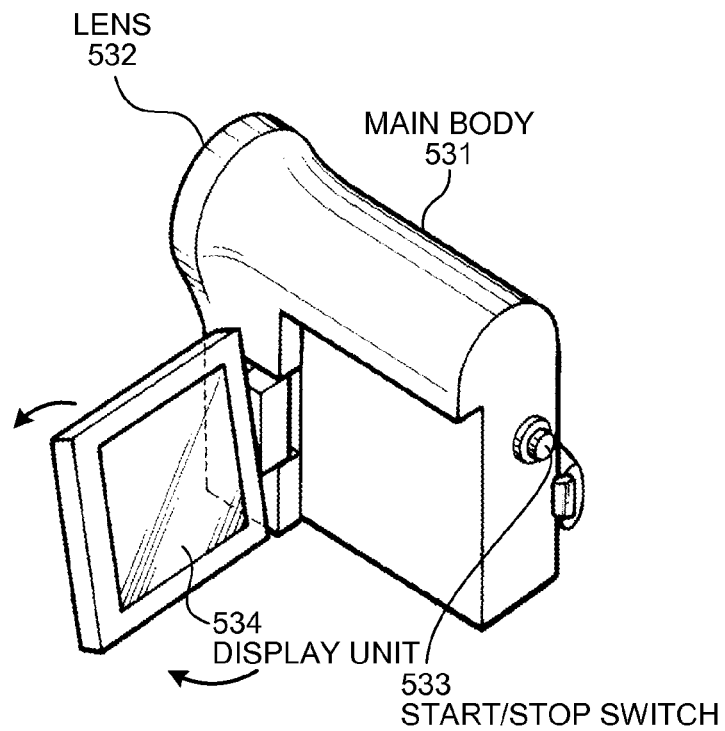
FIG. 33 is a schematic of an example of an electronic apparatus to which the display device with a touch detecting function or the display device according to the present embodiments is applied.

An electronic apparatus illustrated in FIG. 33 is a video camera to which the display device 1 with a touch detecting function and the display device according to the present embodiments and the modifications are applied. The video camera includes a main body 531, a lens 532 provided to the front side surface of the main body 531 and used for photographing a subject, a start/stop switch 533 used in photographing, and a display unit 534, for example. The display unit 534 corresponds to the display device 1 with a touch detecting function and the display device according to the present embodiments and the modifications.

2-4. Fourth Application Example

Figure 34:
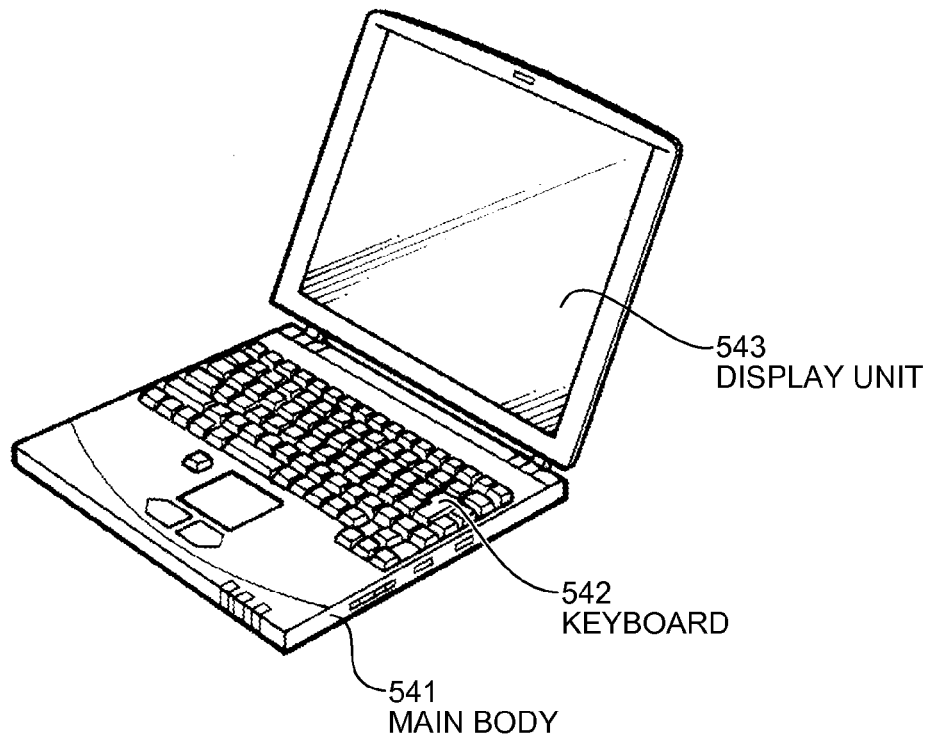
FIG. 34 is a schematic of an example of an electronic apparatus to which the display device with a touch detecting function or the display device according to the present embodiments is applied.
Figure 35:
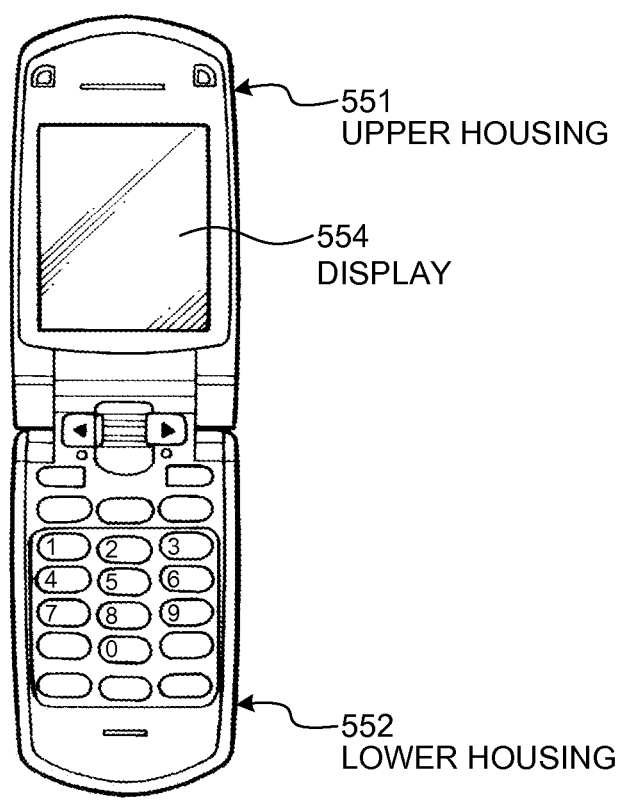
FIG. 35 is a schematic of an example of an electronic apparatus to which the display device with a touch detecting function or the display device according to the present embodiments is applied.
Figure 36:
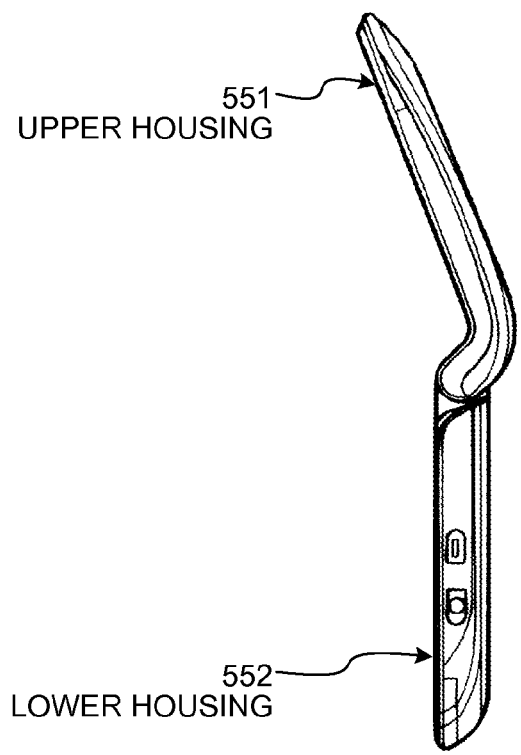
FIG. 36 is another schematic of the example of the electronic apparatus to which the display device with a touch detecting function or the display device according to the present embodiments is applied.
Figure 37:
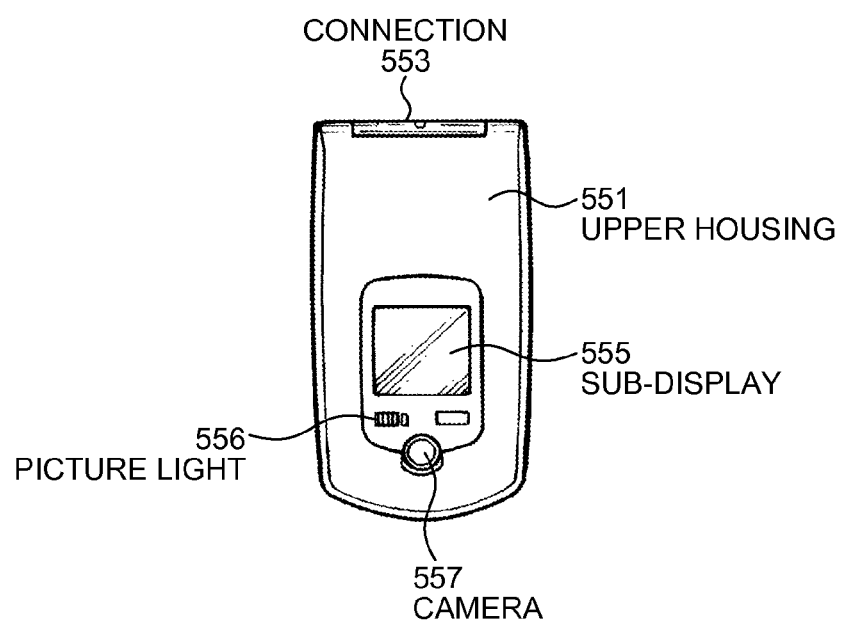
FIG. 37 is still another schematic of the example of the electronic apparatus to which the display device with a touch detecting function or the display device according to the present embodiments is applied.
Figure 38:
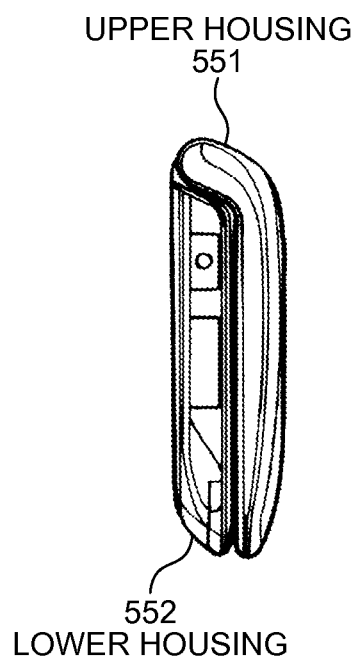
FIG. 38 is still another schematic of the example of the electronic apparatus to which the display device with a touch detecting function or the display device according to the present embodiments is applied.
Figure 39:
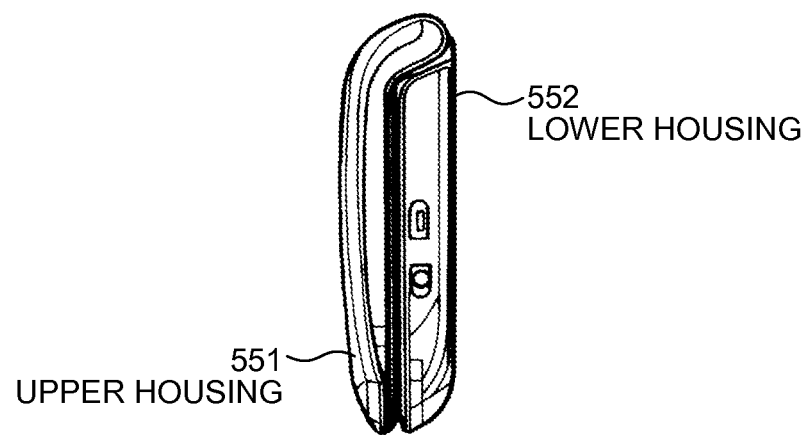
FIG. 39 is still another schematic of the example of the electronic apparatus to which the display device with a touch detecting function or the display device according to the present embodiments is applied.
Figure 40:
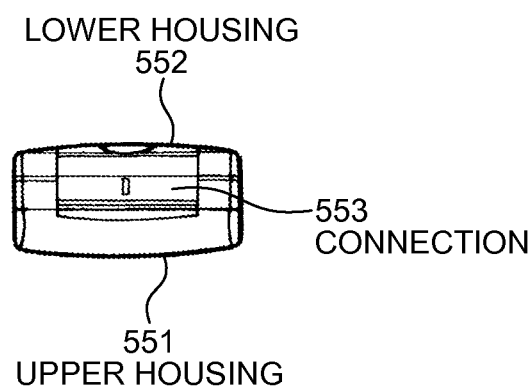
FIG. 40 is still another schematic of the example of the electronic apparatus to which the display device with a touch detecting function or the display device according to the present embodiments is applied.

An electronic apparatus illustrated in FIG. 34 is a notebook personal computer to which the display device 1 with a touch detecting function and the display device according to the present embodiments and the modifications are applied. The notebook personal computer includes a main body 541, a keyboard 542 used for input of characters, and a display unit 543 that displays an image, for example. The display unit 543 corresponds to the display device 1 with a touch detecting function and the display device according to the present embodiments and the modifications.

2-5. Fifth Application Example

An electronic apparatus illustrated in FIG. 35 to FIG. 40 is a mobile phone to which the display device 1 with a touch detecting function and the display device according to the present embodiments and the modifications are applied. The mobile phone includes an upper housing 551 and a lower housing 552 connected by a connection (a hinge) 553, for example. The mobile phone includes a display 554, a sub-display 555, a picture light 556, and a camera 557. The display 554 and/or the sub-display 555 correspond to the display device 1 with a touch detecting function and the display device according to the present embodiments and the modifications.

2-6. Sixth Application Example

Figure 41:
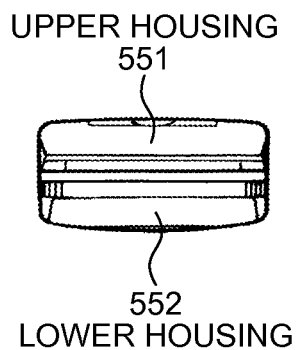
FIG. 41 is still another schematic of the example of the electronic apparatus to which the display device with a touch detecting function or the display device according to the present embodiments is applied.
Figure 42:
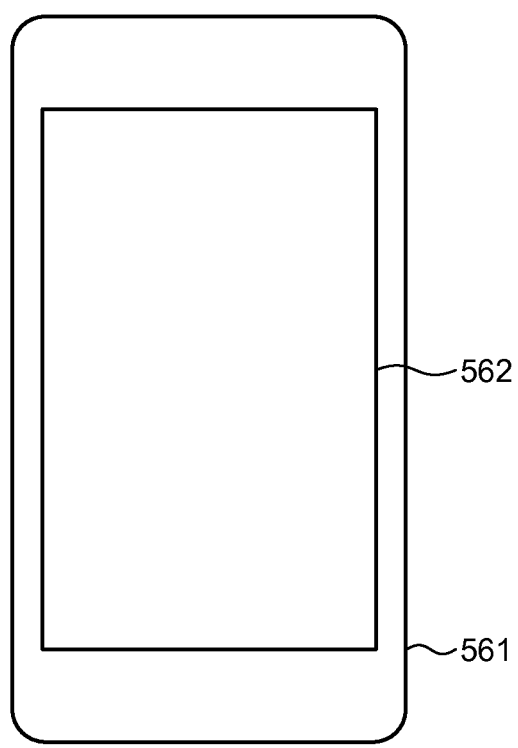
FIG. 42 is a schematic of an example of the electronic apparatus to which the display device with a touch detecting function or the display device according to the present embodiments is applied.

An electronic apparatus illustrated in FIG. 41 operates as a mobile computer, a multifunctional mobile phone, a mobile computer capable of making a voice call, or a mobile computer capable of performing communications. The electronic apparatus is a portable information terminal, which may be called a smartphone or a tablet terminal. The portable information terminal includes a display unit 562 on the surface of a housing 561, for example. The display unit 562 corresponds to the display device 1 with a touch detecting function and the display device according to the present embodiments and the modifications.

3. ASPECTS OF THE PRESENT DISCLOSURE

The present disclosure includes the following aspects.
(1) A display device with a touch detecting function comprising:
  a substrate;
  a display area in which pixels each composed of a plurality of color areas are arranged in a matrix on a plane parallel to a surface of the substrate;
  a touch detection electrode including a first conductive thin wire extending in a first direction on a plane parallel to the surface of the substrate;
  a dummy electrode provided to an area in which the first conductive thin wire is not arranged in a direction perpendicular to the surface of the substrate and including a plurality of second conductive thin wires;
  a drive electrode having capacitance for the touch detection electrode; and
  a display functional layer having a function to display an image on the display area, wherein
  each of the second conductive thin wires includes a plurality of thin wire pieces extending in a direction different from the first direction and is divided by a slit between the thin wire pieces, and
  a color area in the display area with which the slit overlaps has a different color from a color area in the display area with which a slit closest to the slit in a second direction orthogonal to the first direction overlaps.
(2) The display device with a touch detecting function according to (1), wherein the color of the color area in the display area with which the slit overlaps has a different color from a color area in the display area with which a slit closest to the slit in the first direction overlaps.

(3) The display device with a touch detecting function according to (1), wherein
the second conductive thin wires are provided parallel to the first direction,
each of the second conductive thin wires comprises:
a first thin wire piece arranged at a first arrangement pitch in the second direction; and
a second thin wire piece arranged at a second arrangement pitch different from the first arrangement pitch in the second direction, and
the first thin wire piece and the second thin wire piece are separated by the slit.

(4) The display device with a touch detecting function according to (1), wherein the first thin wire piece is as long as the second thin wire piece in the first direction.

(5) The display device with a touch detecting function according to (3), wherein the first conductive thin wire is provided in plurality parallel to a pixel array direction, in which the pixels are arranged, and is arranged such that an arrangement pitch between first conductive thin wires adjacent to each other partially includes the first arrangement pitch and the second arrangement pitch.

(6) The display device with a touch detecting function according to (1), wherein each of the second conductive thin wires includes the thin wire pieces in a linear shape having a first end and a second end, includes a bent portion where the second end of one thin wire piece of thin wire pieces adjacent to each other and the first end of the other thin wire piece of the two thin wire pieces are connected, and is arranged such that the one thin wire piece extends at an angle with respect to the first direction and the other thin wire piece extends in a direction different from the direction of the one thin wire piece in a manner changing the angle with respect to the first direction at the bent portion.

(7) The display device with a touch detecting function according to (6), wherein, when the angle with respect to the first direction at the bent portion is a first angle, an angle with respect to the first direction at a bent portion closest to the bent portion in the first direction is a second angle different from the first angle.

(8) The display device with a touch detecting function according to (1), wherein the first conductive thin wire has a mesh shape including an intersection, and each of the second conductive thin wires has the slit at a portion corresponding to the intersection.

(9) A display device with a touch detecting function comprising:
a substrate;
a display area in which pixels each composed of a plurality of color areas are arranged in a matrix on a plane parallel to a surface of the substrate;
a touch detection electrode including a first conductive thin wire extending in a first direction on a plane parallel to the surface of the substrate;
a dummy electrode provided to an area in which the first conductive thin wire is not arranged in a direction perpendicular to the surface of the substrate and including a plurality of second conductive thin wires;
a drive electrode having capacitance for the touch detection electrode; and
a display functional layer having a function to display an image on the display area, wherein
the second conductive thin wires are provided parallel to a pixel array direction, in which the pixels are arranged,
each of the second conductive thin wires comprises:
a first thin wire piece having a portion extending in a direction different from the first direction and arranged at a first arrangement pitch in a second direction orthogonal to the first direction; and
a second thin wire piece having a portion extending in a direction different from the first direction, being as long as the first thin wire piece in the first direction, and arranged at a second arrangement pitch different from the first arrangement pitch in the second direction, and
the first thin wire piece and the second thin wire piece are arranged so as not to overlap with each other in the first direction, and an end of the first thin wire piece and an end of the second thin wire piece are arranged in the second direction and do not overlap with each other, thereby forming a slit to divide the second conductive thin wire.

(10) An electronic apparatus comprising a display device with a touch detecting function, wherein
the display device with a touch detecting function comprises:
a substrate;
a display area in which pixels each composed of a plurality of color areas are arranged in a matrix on a plane parallel to a surface of the substrate;
a touch detection electrode including a first conductive thin wire extending in a first direction on a plane parallel to the surface of the substrate;
a dummy electrode provided to an area in which the first conductive thin wire is not arranged in a direction perpendicular to the surface of the substrate and including a plurality of second conductive thin wires;
a drive electrode having capacitance for the touch detection electrode; and
a display functional layer having a function to display an image on the display area,
each of the second conductive thin wires includes a plurality of thin wire pieces extending in a direction different from the first direction and is divided by a slit between the thin wire pieces, and
a color area in the display area with which the slit overlaps has a different color from a color area in the display area with which a slit closest to the slit in a second direction orthogonal to the first direction overlaps.

(11) An electronic apparatus comprising a display device with a touch detecting function, wherein
the display device with a touch detecting function comprises:
a substrate;
a display area in which pixels each composed of a plurality of color areas are arranged in a matrix in a first direction on a plane parallel to a surface of the substrate;
a touch detection electrode including a first conductive thin wire extending on a plane parallel to the surface of the substrate;
a dummy electrode provided to an area in which the first conductive thin wire is not arranged in a direction perpendicular to the surface of the substrate and including a plurality of second conductive thin wires;
a drive electrode having capacitance for the touch detection electrode; and
a display functional layer having a function to display an image on the display area,
the second conductive thin wires are provided parallel to a pixel array direction, in which the pixels are arranged,
each of the second conductive thin wires comprises:
a first thin wire piece having a portion extending in a direction different from the first direction and arranged at a first arrangement pitch in a second direction orthogonal to the first direction; and a second thin wire piece having a portion extending in a direction different from the first direction, being as long as the first thin wire piece in the first direction, and arranged at a second arrangement pitch different from the first arrangement pitch in the second direction, and the first thin wire piece and the second thin wire piece are arranged so as not to overlap with each other in the first direction, and an end of the first thin wire piece and an end of the second thin wire piece are arranged in the second direction and do not overlap with each other, thereby forming a slit to divide the second conductive thin wire.

The electronic apparatus according to the present disclosure includes the above-mentioned display device with a touch detecting function. Examples of the electronic apparatus according to the present disclosure include, but are not limited to, television apparatuses, digital cameras, personal computers, video cameras, and portable electronic apparatuses, such as mobile phones.

The display device with a touch detecting function and the electronic apparatus according to the present disclosure can reduce the possibility that a slit of the dummy electrode made of a conductive material, which hardly transmits light, is visually recognized.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detecting function comprising:
   a substrate;
   a display area in which pixels each composed of a plurality of color areas are arranged in a matrix on a plane parallel to a surface of the substrate;
   a touch detection electrode including a first conductive thin wire extending in a first direction on a plane parallel to the surface of the substrate;
   a dummy electrode provided to an area in which the first conductive thin wire is not arranged in a direction perpendicular to the surface of the substrate and including a plurality of second conductive thin wires;
   a drive electrode having capacitance for the touch detection electrode; and
   a display functional layer having a function to display an image on the display area, wherein
   each of the second conductive thin wires includes a plurality of thin wire pieces extending in a direction different from the first direction and is divided by a slit between the thin wire pieces, and
   a color area in the display area with which the slit overlaps has a different color from a color area in the display area with which a slit closest to the slit in a second direction orthogonal to the first direction overlaps, and the color of the color area in the display area with which the slit overlaps has a different color from a color area in the display area with which a slit closest to the slit in the first direction overlaps.

2. The display device with a touch detecting function according to claim 1, wherein
   the second conductive thin wires are provided parallel to the first direction,
   each of the second conductive thin wires comprises:
      a first thin wire piece arranged at a first arrangement pitch in the second direction; and
      a second thin wire piece arranged at a second arrangement pitch different from the first arrangement pitch in the second direction, and
   the first thin wire piece and the second thin wire piece are separated by the slit.

3. The display device with a touch detecting function according to claim 2, wherein the first thin wire piece is as long as the second thin wire piece in the first direction.

4. The display device with a touch detecting function according to claim 2, wherein the first conductive thin wire is provided in plurality parallel to a pixel array direction, in which the pixels are arranged, and is arranged such that an arrangement pitch between first conductive thin wires adjacent to each other partially includes the first arrangement pitch and the second arrangement pitch.

5. The display device with a touch detecting function according to claim 1, wherein each of the second conductive thin wires includes the thin wire pieces in a linear shape having a first end and a second end, includes a bent portion where the second end of one thin wire piece of thin wire pieces adjacent to each other and the first end of the other thin wire piece of the two thin wire pieces are connected, and is arranged such that the one thin wire piece extends at an angle with respect to the first direction and the other thin wire piece extends in a direction different from the direction of the one thin wire piece in a manner changing the angle with respect to the first direction at the bent portion.

6. The display device with a touch detecting function according to claim 5, wherein, when the angle with respect to the first direction at the bent portion is a first angle, an angle with respect to the first direction at a bent portion closest to the bent portion in the first direction is a second angle different from the first angle.

7. The display device with a touch detecting function according to claim 1, wherein the first conductive thin wire has a mesh shape including an intersection, and each of the second conductive thin wires has the slit at a portion corresponding to the intersection.

8. A display device with a touch detecting function comprising:
   a substrate;
   a display area in which pixels each composed of a plurality of color areas are arranged in a matrix on a plane parallel to a surface of the substrate;
   a touch detection electrode including a first conductive thin wire extending in a first direction on a plane parallel to the surface of the substrate;
   a dummy electrode provided to an area in which the first conductive thin wire is not arranged in a direction perpendicular to the surface of the substrate and including a plurality of second conductive thin wires;
   a drive electrode having capacitance for the touch detection electrode; and
   a display functional layer having a function to display an image on the display area, wherein the second conductive thin wires are provided parallel to a pixel array direction, in which the pixels are arranged,
   each of the second conductive thin wires comprises:
      a first thin wire piece having a portion extending in a direction different from the first direction and arranged at a first arrangement pitch in a second direction orthogonal to the first direction; and a second thin wire piece having a portion extending in a direction different from the first direction, being as long as the first thin wire piece in the first direction, and arranged at a second arrangement pitch different from the first arrangement pitch in the second direction, and the first thin wire piece and the second thin wire piece are arranged so as not to overlap with each other in the first direction, and an end of the first thin wire piece and an end of the second thin wire piece are arranged in the second direction and do not overlap with each other, thereby forming a slit to divide the second conductive thin wire.

9. An electronic apparatus comprising a display device with a touch detecting function, wherein the display device with a touch detecting function comprises:

a substrate;

a display area in which pixels each composed of a plurality of color areas are arranged in a matrix on a plane parallel to a surface of the substrate;

a touch detection electrode including a first conductive thin wire extending in a first direction on a plane parallel to the surface of the substrate;

a dummy electrode provided to an area in which the first conductive thin wire is not arranged in a direction perpendicular to the surface of the substrate and including a plurality of second conductive thin wires;

a drive electrode having capacitance for the touch detection electrode; and a display functional layer having a function to display an image on the display area, each of the second conductive thin wires includes a plurality of thin wire pieces extending in a direction different from the first direction and is divided by a slit between the thin wire pieces, and a color area in the display area with which the slit overlaps has a different color from a color area in the display area with which a slit closest to the slit in a second direction orthogonal to the first direction overlaps, and the color of the color area in the display area with which the slit overlaps has a different color from a color area in the display area with which a slit closest to the slit in the first direction overlaps.

10. An electronic apparatus comprising a display device with a touch detecting function, wherein the display device with a touch detecting function comprises:

a substrate;

a display area in which pixels each composed of a plurality of color areas are arranged in a matrix in a first direction on a plane parallel to a surface of the substrate;

a touch detection electrode including a first conductive thin wire extending on a plane parallel to the surface of the substrate;

a dummy electrode provided to an area in which the first conductive thin wire is not arranged in a direction perpendicular to the surface of the substrate and including a plurality of second conductive thin wires;

a drive electrode having capacitance for the touch detection electrode; and a display functional layer having a function to display an image on the display area, the second conductive thin wires are provided parallel to a pixel array direction, in which the pixels are arranged, each of the second conductive thin wires comprises:

a first thin wire piece having a portion extending in a direction different from the first direction and arranged at a first arrangement pitch in a second direction orthogonal to the first direction; and a second thin wire piece having a portion extending in a direction different from the first direction, being as long as the first thin wire piece in the first direction, and arranged at a second arrangement pitch different from the first arrangement pitch in the second direction, and the first thin wire piece and the second thin wire piece are arranged so as not to overlap with each other in the first direction, and an end of the first thin wire piece and an end of the second thin wire piece are arranged in the second direction and do not overlap with each other, thereby forming a slit to divide the second conductive thin wire.

11. A display device with a touch detecting function comprising:

a substrate;

a display area in which pixels each composed of a plurality of color areas are arranged in a matrix on a plane parallel to a surface of the substrate;

a touch detection electrode including a first conductive thin wire extending in a first direction on a plane parallel to the surface of the substrate;

a dummy electrode provided to an area in which the first conductive thin wire is not arranged in a direction perpendicular to the surface of the substrate and including a plurality of second conductive thin wires;

a drive electrode having capacitance for the touch detection electrode; and a display functional layer having a function to display an image on the display area, wherein each of the second conductive thin wires includes a plurality of thin wire pieces extending in a direction different from the first direction and is divided by a slit between the thin wire pieces, the second conductive thin wires are provided parallel to the first direction, each of the second conductive thin wires comprises a first thin wire piece arranged at a first arrangement pitch in the second direction, and a second thin wire piece arranged at a second arrangement pitch different from the first arrangement pitch in the second direction, the first thin wire piece and the second thin wire piece are separated by the slit, and a color area in the display area with which the slit overlaps has a different color from a color area in the display area with which a slit closest to the slit in a second direction orthogonal to the first direction overlaps.

12. The display device with a touch detecting function according to claim 11, wherein the first thin wire piece is as long as the second thin wire piece in the first direction.

13. The display device with a touch detecting function according to claim 11, wherein the first conductive thin wire is provided in plurality parallel to a pixel array direction, in which the pixels are arranged, and is arranged such that an arrangement pitch between first conductive thin wires adjacent to each other partially includes the first arrangement pitch and the second arrangement pitch.

14. A display device with a touch detecting function comprising:
- a substrate;
- a display area in which pixels each composed of a plurality of color areas are arranged in a matrix on a plane parallel to a surface of the substrate;
- a touch detection electrode including a first conductive thin wire extending in a first direction on a plane parallel to the surface of the substrate;
- a dummy electrode provided to an area in which the first conductive thin wire is not arranged in a direction perpendicular to the surface of the substrate and including a plurality of second conductive thin wires;
- a drive electrode having capacitance for the touch detection electrode; and
- a display functional layer having a function to display an image on the display area, wherein
- each of the second conductive thin wires includes a plurality of thin wire pieces extending in a direction different from the first direction and is divided by a slit between the thin wire pieces,
- each of the second conductive thin wires includes the thin wire pieces in a linear shape having a first end and a second end, includes a bent portion where the second end of one thin wire piece of thin wire pieces adjacent to each other and the first end of the other thin wire piece of the two thin wire pieces are connected, and is arranged such that the one thin wire piece extends at an angle with respect to the first direction and the other thin wire piece extends in a direction different from the direction of the one thin wire piece in a manner changing the angle with respect to the first direction at the bent portion, and
- a color area in the display area with which the slit overlaps has a different color from a color area in the display area with which a slit closest to the slit in a second direction orthogonal to the first direction overlaps.

15. The display device with a touch detecting function according to claim 14, wherein, when the angle with respect to the first direction at the bent portion is a first angle, an angle with respect to the first direction at a bent portion closest to the bent portion in the first direction is a second angle different from the first angle.

16. A display device with a touch detecting function comprising:
- a substrate;
- a display area in which pixels each composed of a plurality of color areas are arranged in a matrix on a plane parallel to a surface of the substrate;
- a touch detection electrode including a first conductive thin wire extending in a first direction on a plane parallel to the surface of the substrate;
- a dummy electrode provided to an area in which the first conductive thin wire is not arranged in a direction perpendicular to the surface of the substrate and including a plurality of second conductive thin wires;
- a drive electrode having capacitance for the touch detection electrode; and
- a display functional layer having a function to display an image on the display area, wherein
- each of the second conductive thin wires includes a plurality of thin wire pieces extending in a direction different from the first direction and is divided by a slit between the thin wire pieces,
- the first conductive thin wire has a mesh shape including an intersection, and each of the second conductive thin wires has the slit at a portion corresponding to the intersection, and
- a color area in the display area with which the slit overlaps has a different color from a color area in the display area with which a slit closest to the slit in a second direction orthogonal to the first direction overlaps.

* * * * *